United States Patent
Kim et al.

(10) Patent No.: US 9,170,659 B2
(45) Date of Patent: Oct. 27, 2015

(54) MOBILE TERMINAL

(71) Applicant: LG ELECTRONICS INC., Seoul (KR)

(72) Inventors: Hyunjoong Kim, Seoul (KR); Dongguk Kang, Seoul (KR); Chulbae Lee, Seoul (KR); Byunghwa Lee, Seoul (KR); Choonghwan Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 14/136,683

(22) Filed: Dec. 20, 2013

(65) Prior Publication Data

US 2014/0347330 A1    Nov. 27, 2014

(30) Foreign Application Priority Data

May 23, 2013    (KR) .................. 10-2013-0058465
May 23, 2013    (KR) .................. 10-2013-0058467
May 23, 2013    (KR) .................. 10-2013-0058469

(51) Int. Cl.
*G09G 5/00* (2006.01)
*G06F 3/0346* (2013.01)
*H04M 1/23* (2006.01)
*G06F 1/16* (2006.01)

(52) U.S. Cl.
CPC ............ *G06F 3/0346* (2013.01); *G06F 1/1637* (2013.01); *H04M 1/236* (2013.01); *H04M 2250/16* (2013.01); *H04M 2250/18* (2013.01); *H04M 2250/22* (2013.01)

(58) Field of Classification Search
CPC .... G06F 1/1637; G06F 3/0346; H04M 1/236; H04M 2250/16; H04M 2250/22
USPC .................................................. 345/156, 173
See application file for complete search history.

(56) References Cited

U.S. PATENT DOCUMENTS

| | | | |
|---|---|---|---|
| 2009/0323262 A1 | 12/2009 | Arita | |
| 2010/0164871 A1* | 7/2010 | Shigeta et al. | 345/169 |
| 2012/0276958 A1* | 11/2012 | Inami | 455/566 |
| 2013/0012264 A1* | 1/2013 | Mitsunaga | 455/556.1 |

FOREIGN PATENT DOCUMENTS

EP    1387554 A1    2/2004

* cited by examiner

*Primary Examiner* — Viet Pham
(74) *Attorney, Agent, or Firm* — Dentons US LLP

(57) ABSTRACT

The present disclose provides a mobile terminal, including a terminal body having a front surface and a rear surface, a front display unit disposed on the front surface and configured to output visual information thereon, and a rear input unit disposed on the rear surface and configured to be manipulated to input a control command, wherein the rear input unit includes a frame installed on a case of the terminal body to be manipulated in a pressing manner, and having a mounting portion, and a rear display mounted onto the mounting portion, and configured to output visual information toward the rear surface, the visual information being related to an event generated in the mobile terminal.

19 Claims, 33 Drawing Sheets

MOBILE TERMINAL

This application claims priority to Korean Application No. 10-2013-0058465, filed May 23, 2013; Korean Application No. 10-2013-0058467, filed May 23, 2013; and Korean Application No. 10-2013-0058469, filed May 23, 2013, each of which is hereby incorporated by reference in its entirety.

CROSS-REFERENCE TO RELATED APPLICATION

Pursuant to 35 U.S.C. §119(a), this application claims the benefit of earlier filing date and right of priority to Korean Application No. 10-2013-0058465, filed on May 23, 2013, Korean Application No. 10-2013-0058467, filed on May 23, 2013, and Korean Application No. 10-2013-0058469, filed on May 23, 2013, the contents of which are incorporated by reference herein in their entireties.

BACKGROUND OF THE DISCLOSURE

1. Field of the Disclosure

This specification relates to a mobile terminal having a user input unit by which a control command is input.

2. Background of the Disclosure

Mobile terminals are electronic devices which are portable and have at least one of voice and telephone call functions, information input and/or output functions, a data storage function and the like.

As it becomes multifunctional, the mobile terminal can be allowed to capture still images or moving images, play music or video files, play games, receive broadcast and the like, so as to be implemented as an integrated multimedia player.

Many efforts are undergoing to support and enhance various functions as such multimedia player in view of hardware or software improvements. As one example, a user interface environment is provided in order for users to easily and conveniently perform a voice (audio) recording or retrieve or select a voice (audio) file.

Furthermore, as a mobile terminal is considered as a personal belonging for expressing one's own personality, various design forms are required. The design forms include structural changes and improvements for the user to more conveniently use the mobile terminal. As one of the structural changes and improvements, a user input unit may be taken into account.

For example, a user input unit may be implemented as a touch screen on a front surface of a mobile terminal or a separate key to receive a user input. However, the touch screen has a drawback in that an object to be manipulated is obscured by a finger or a stylus pen. In order to obviate the drawback, if a key is provided on a front or side surface of a terminal body, it may interfere with a slim size and a simple design of the terminal. Hence, a user input unit of a new structure to overcome those drawbacks may be considered.

SUMMARY OF THE DISCLOSURE

Therefore, an aspect of the detailed description is to provide a mobile terminal, capable of receiving a user input of a new type, different from the related art.

Another aspect of the detailed description is to provide a mobile terminal, capable of applying a new design to a rear surface of the terminal.

To achieve these and other advantages and in accordance with the purpose of this specification, as embodied and broadly described herein, there is provided a mobile terminal, including a terminal body having a front surface and a rear surface, a front display unit disposed on the front surface and configured to output visual information thereon, and a rear input unit disposed on the rear surface and configured to be manipulated to input a control command, wherein the rear input unit may include a frame installed on a case of the terminal body to be manipulated in a pressing manner, and having a mounting portion, and a rear display mounted onto the mounting portion, and configured to output visual information toward the rear surface, the visual information being related to an event generated in the mobile terminal.

In accordance with one exemplary embodiment of this specification, the rear display may be configured to output thereon visual information in cooperation with the front display unit.

In accordance with another exemplary embodiment of this specification, the visual information output on the front display unit may be changed in response to the frame being pressed.

In accordance with another exemplary embodiment of this specification, the rear display may be disposed to overlap the front display unit in a thickness direction of the terminal body.

In accordance with another exemplary embodiment of this specification, the frame may be tilted when one side thereof is pressed, so as to press a side switch corresponding to the one side. The frame may be configured to generate a different control command according to a tilting direction. Also, the side switch may be disposed on each edge of the frame or each portion between two edges of the frame.

The frame may include a side actuator protruding from a rear surface thereof and configured to press the side switch when the one side of the frame is pressed.

Or, a side actuator which presses the side switch when the one side of the frame is pressed may be formed on an upper end portion of the side switch in an integral form with the side switch. The frame may include a supporting portion recessed into a rear surface of the frame, facing the side switch, and configured to cover a part of an outer side of the side actuator.

The mobile terminal may further include a button part disposed on the rear surface to be manipulated in a pressing manner, and disposed to overlap the front display unit in a thickness direction of the terminal body, the button part being configured to generate a control command corresponding to ON/OFF of the front display unit when being pressed.

The mobile terminal may further include a flexible printed circuit board having the side switch pressed when the frame is tilted and a button switch pressed in response to the button being pressed, and mounted on a shield can installed on a printed circuit board.

Also, the mobile terminal may further include a camera module disposed on the rear surface and configured to capture an image. An image captured by the camera module may be output on the rear display when the camera module is operating. The camera module, the rear input unit and the button part may be arranged along a lengthwise direction of the terminal body.

In accordance with another exemplary embodiment of this specification, the rear input unit may further include a window mounted onto the frame to cover the rear display, and processed opaque, except for a portion corresponding to the rear display. A touch sensor for sensing a touch input applied onto the window may be located between the window and the rear display.

The controller may execute a function related to the event when a touch onto the window is sensed by the touch sensor and a status change of the terminal body is sensed by a sensing unit, while visual information related to the event is output on the rear display.

The sensing unit may sense the change in a placed status of the terminal body in a proximity sensor, a light sensor, or gyro sensor.

The rear display may be turned off and the front display unit may output the visual information related to the event when the function associated with the event is executed by the controller.

A window associated with the event may be popped-up when a multi-touch onto the front display unit is sensed while the function associated with the event is executed.

A pointer may be displayed on the front display unit and movable in response to dragging on the window when a touch input onto the window is sensed by the touch sensor.

The mobile terminal may further include a controller which controls functions of the mobile terminal. The controller may generate a control command when the window is touched with respect to the rear display and simultaneously the frame is pressed.

In accordance with another exemplary embodiment of this specification, the mobile terminal may further include a controller which controls functions of the mobile terminal. The controller may process the pressing of the frame as a control command of a different function according to an operating mode of the mobile terminal.

In accordance with another exemplary embodiment of this specification, visual information output on the rear display may be changed in response to the frame being pressed.

In accordance with another exemplary embodiment of this specification, the front display unit may be configured in such a manner that a touch input is sensed, and a key may not be arranged on the front surface.

A mobile terminal in accordance with another exemplary embodiment to achieve those aspects and other advantages may include a terminal body having a front surface and a rear surface, a display unit disposed on the front surface and configured to output visual information thereon, a camera module disposed on the rear surface and having a lens part for capturing an image, and a rear input unit disposed on the rear surface and configured to be manipulated to input a control command, wherein the rear input unit may include a wheel key externally exposed on the rear surface and rotatable in a first rotating direction and a second rotating direction opposite to the first rotating direction, a frame mounted to a case of the terminal body and having a hole corresponding to the lens part and a through hole for insertion of the wheel key therein, and a window mounted to the frame to cover the holes.

In accordance with one exemplary embodiment of this specification, visual information output on the display unit may be changed in response to rotation of the wheel key.

In accordance with another exemplary embodiment of this specification, the wheel key may be disposed to overlap the display unit in a thickness direction of the terminal body.

In accordance with another exemplary embodiment of this specification, the wheel key may generate a contrary control command according to the first or second rotating direction.

In accordance with another exemplary embodiment of this specification, the wheel key may include a magnetic member divided into N-pole and S-pole. The rear input unit may further include hall integrated circuits (ICs) provided in plurality and disposed adjacent to the magnetic member so as to detect the rotating direction of the wheel key using each sensed change in magnetism due to the magnetic member.

The rear input unit may further include a flexible printed circuit board with the hall ICs mounted thereon, and a C-clip mounted onto a printed circuit board disposed within the terminal body and partially bent to be electrically contactable with the flexible printed circuit board.

In accordance with another exemplary embodiment of this specification, the rear input unit may further include a base coupled to the frame and having supporting portions for rotatably supporting both ends of the wheel key, and a bracket having a cover coupled to cover the supporting portions and having at least a part including the cover externally exposed through the through hole.

The frame may include first hooks on which the base is hooked to be supported, and second hooks on which the bracket is hooked to be supported. The first hooks may protrude from an inner wall of the frame, which forms the through hole.

In accordance with another exemplary embodiment of this specification, the frame may include coupling portions having coupling holes, respectively. The frame may be fixed to the case in such a manner that bosses protruding from the case are welded after being inserted into the coupling holes.

In accordance with another exemplary embodiment of this specification, the window may be processed to be opaque, except for a portion corresponding to the hole.

In accordance with another exemplary embodiment of this specification, the rear input unit may further include a raised spot protruding to the outside between the lens part and the wheel key. The raised spot may protrude from the frame or the window.

In accordance with another exemplary embodiment of this specification, the mobile terminal may further include a flash disposed on the rear surface to emit light. The window may be disposed to cover the flash.

In accordance with another exemplary embodiment of this specification, the rear input unit may further include a rear display formed to output visual information toward the rear surface and disposed to be covered by the window. Visual information output on the rear display may be changed in response to rotation of the wheel key.

In accordance with another exemplary embodiment of this specification, the display unit may be configured to sense a touch input and a key may not be arranged on the front surface.

In accordance with another exemplary embodiment of this specification, the mobile terminal may further include a controller which controls functions of the mobile terminal. The controller may process the rotation of the wheel key as a control command of a different function according to an operating mode of the mobile terminal.

The display unit may be configured to sense a touch input, and the controller may generate a corresponding control command when a touch input with respect to the display unit and the rotation of the wheel key are simultaneously sensed.

A mobile terminal in accordance with another exemplary embodiment to achieve those aspects and other advantages may include a terminal body having a front surface and a rear surface, a display unit disposed on the front surface and configured to output visual information thereon, and a rear input unit disposed on the rear surface and configured to be manipulated to input a control command, wherein the rear input unit may include a button part externally exposed on the rear surface and receiving a push input of a first function, and a touch part having first and second touch keys disposed on both sides based on the button part and receiving a touch input of a second function different from the first function.

In accordance with one exemplary embodiment of this specification, the touch part may include a window made of a transparent material and having a through hole corresponding to the button part, and a touch sensor disposed on a rear surface of the window and configured to sense a touch input with respect to the window.

In accordance with one exemplary embodiment of this specification, the window may completely cover an outer circumference of the button part inserted into the through hole.

In accordance with another exemplary embodiment of this specification, the touch sensor may be implemented into a form of a sheet having a hole corresponding to the button part, and completely cover an outer circumference of the button part inserted into the hole.

In accordance with another exemplary embodiment of this specification, an adhesive member may be disposed between the window and the touch sensor. The adhesive member may be configured to couple the window and the touch sensor to each other and be made of a conductive material for transferring a touch input onto the window to the touch sensor.

In accordance with another exemplary embodiment of this specification, a camera module which is configured to capture an image may be disposed at one side of the first touch key, and the window may cover a lens part of the camera module. The window may be processed to be opaque except for a portion corresponding to the lens part. Also, the camera module, the first touch key, the button part and the second touch key may be sequentially arranged in one direction. Also, a raised spot may protrude between a portion corresponding to the lens part and a portion corresponding to the first touch key.

In accordance with another exemplary embodiment of this specification, the button part may include a key top externally exposed through the through hole, and an elastic member disposed on a rear surface of the key top and having an actuator. Both ends of the elastic member may be coupled to the case of the terminal body to elastically support the key top when the key top is pressed.

For the key top, a surface externally exposed through the through hole may be a curved surface and an opposite surface to the curved surface may be a plane surface. Also, the window may protrude into a shape of a curved surface toward the key top such that the surface of the window 635c can be smoothly connected with the surface of the key top 634a at a boundary therebetween.

The button part may further include a flexible printed circuit board having a switch pressed by the actuator when the key top is pressed, and disposed between a shield can which is installed on a printed circuit board and the elastic member. The shield can may include supporting portions protruding from an inner surface thereof to be supported on the printed circuit board, so as to support the switch when the actuator is pressed.

In accordance with another exemplary embodiment of this specification, the first and second touch keys may generate control commands contrary to each other.

In accordance with another exemplary embodiment of this specification, the display unit may be configured to sense a touch input, and a touch key and a push key may not be disposed on the front surface.

In accordance with another exemplary embodiment of this specification, the mobile terminal may further include a controller which controls functions of the mobile terminal. The display unit may be configured to sense a touch input, and the controller may generate a control command in response to touch inputs simultaneously applied onto the display unit and the touch part.

In accordance with another exemplary embodiment of this specification, the mobile terminal may further include a controller which controls functions of the mobile terminal. The controller may process an input applied to the rear input unit as a control command of a different function according to an operating mode of the mobile terminal.

In accordance with another exemplary embodiment of this specification, the display unit may output information indicating which touch key of the first and second touch keys is currently touched. As one example, the display unit may output an image related to the rear input unit, and an icon related to the information may be displayed within the image. The icon may change in shape in cooperation with touch inputs applied onto the first and second touch keys.

In accordance with another exemplary embodiment of this specification, the mobile terminal may further include a controller which controls function of the mobile terminal. The controller may generate a control command based on a duration of time of a push input applied to the button part, and the display unit may output information which varies according to the duration of time.

In accordance with another exemplary embodiment of this specification, whether or not the touch part is to be driven may be decided by a push input onto the button part.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of a mobile terminal according to the exemplary embodiments, with reference to the accompanying drawings.

For the sake of brief description with reference to the drawings, the same or equivalent components will be provided with the same or like reference numbers, and description thereof will not be repeated. The expression in the singular form in this specification will cover the expression in the plural form unless otherwise indicated obviously from the context.

Mobile terminals described in this specification may include cellular phones, smart phones, laptop computers, digital broadcasting terminals, personal digital assistants (PDAs), portable multimedia players (PMPs), E-books, navigators, and the like.

Figure 1:
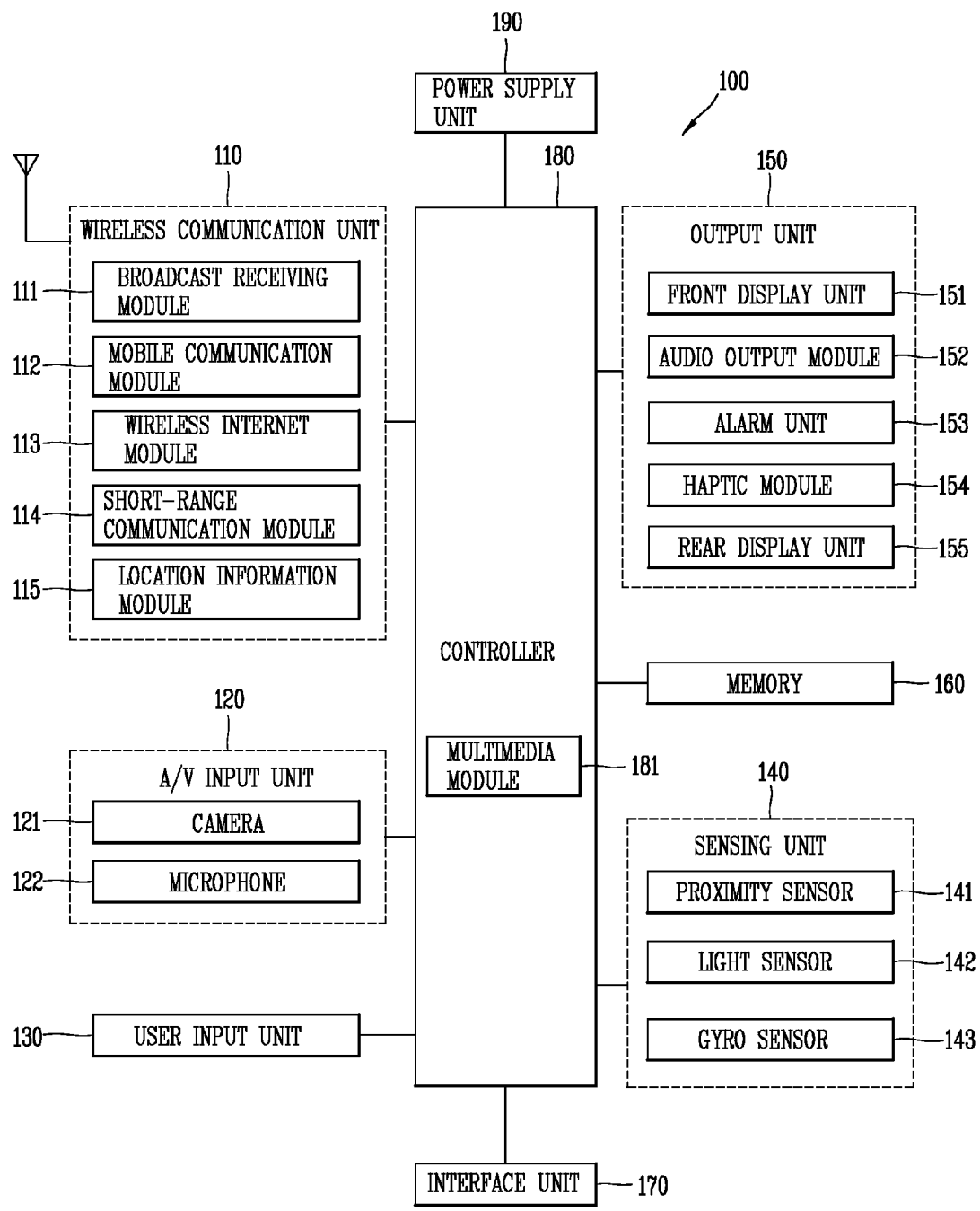
FIG. 1 is a block diagram of a mobile terminal in accordance with one exemplary embodiment of the present disclosure.

FIG. 1 is a block diagram of a mobile terminal in accordance with one exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a front display unit 151 or a rear display unit 155.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141, a light sensor 142, a gyro sensor 143, and the like.

The output unit 150 is configured to provide an output for audio signal, video signal, or alarm signal, and the output unit 150 may include the front display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. A rear structure of the front display unit 151 may also be implemented as a light-transmittable structure. Under this configuration, a user can view an object positioned at a rear side of a terminal body through a region occupied by the front display unit 151 of the terminal body.

In embodiments where the front display unit 151 and a touch sensitive sensor (referred to as 'touch sensor') have an interlayer structure (hereinafter, referred to as a 'touch screen'), the front display unit 151 may be used as an input device in addition to being used as an output device. The touch sensor may be implemented as a touch film, a touch sheet, a touch pad, and the like.

The touch sensor may be configured to convert changes of a pressure applied to a specific part of the front display unit 151, or a capacitance occurring from a specific part of the front display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the front display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into the proximity sensor 141.

Hereinafter, for the sake of convenience of brief explanation, a status that the pointer is positioned to be proximate onto the touch screen without contact will be referred to as "proximity touch," whereas a status that the pointer substantially comes in contact with the touch screen will be referred to as "contact touch." For the position corresponding to the proximity touch of the pointer on the touch screen, such position corresponds to a position where the pointer faces perpendicular to the touch screen upon the proximity touch of the pointer.

The proximity sensor senses 141 proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the front display unit 151 or the audio output unit 152, the front display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

A rear display unit 155 corresponding to the front display unit 151 may be disposed on a rear surface of the mobile terminal 100. The rear display unit 155 may be smaller in size than the front display unit 151, and display relatively brief information.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Explaining the user input unit 130 again, the user input unit 130 according to the present disclosure may be disposed on the rear surface of the terminal so as to implement the front display into a larger screen. Hereinafter, description will be given in more detail, of a detailed structure that the user input unit 130 is disposed on the rear surface and operations implemented thereby.

Figure 2A:
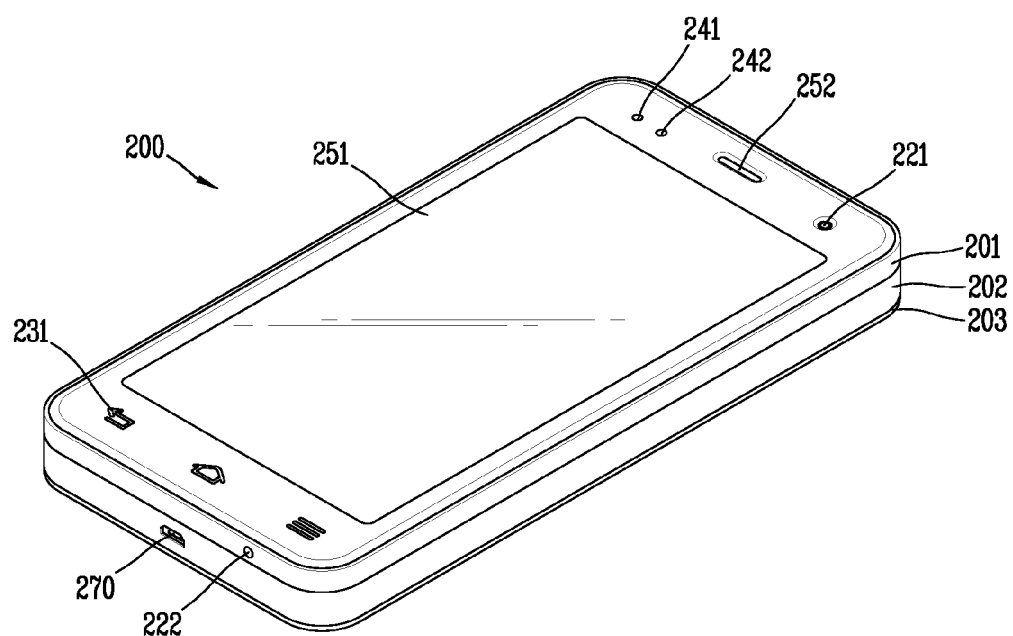
FIG. 2A is a front perspective view illustrating one exemplary embodiment of a mobile terminal according to the present disclosure.
Figure 2B:
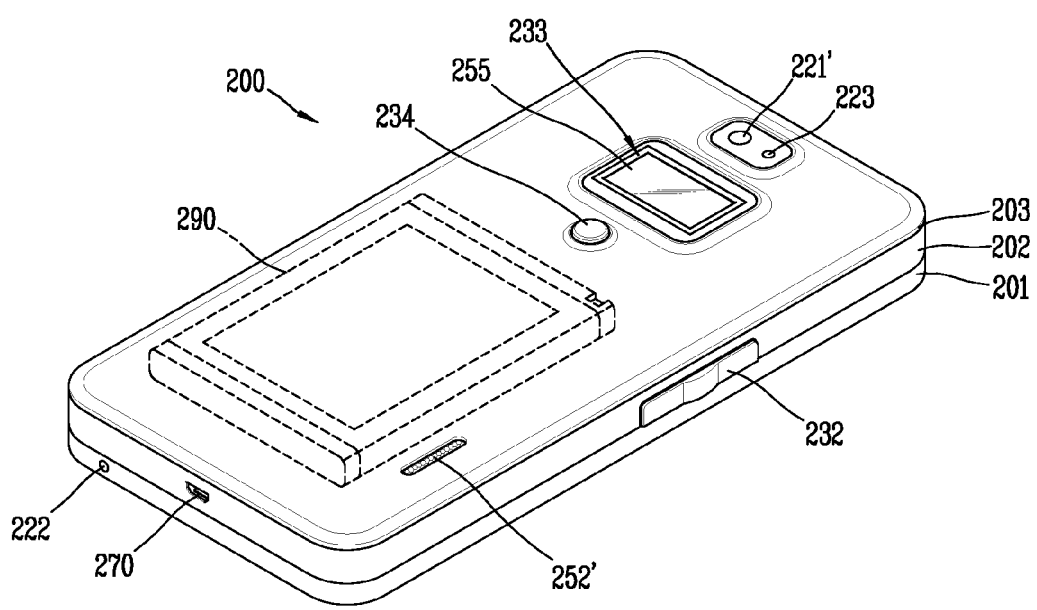
FIG. 2B is a rear perspective view of the mobile terminal of FIG. 2A.

FIG. 2A is a front perspective view illustrating one exemplary embodiment of a mobile terminal 200 according to the present disclosure, and FIG. 2B is a rear perspective view of the mobile terminal 200 of FIG. 2A.

A mobile terminal 200 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

A body may include a case (or referred to as casing, housing, cover, etc.) defining an appearance of the mobile terminal 200. In this exemplary embodiment, the case may be divided into a front case 201 and a rear case 202. A space formed between the front and rear cases 201 and 202 may accommodate various electronic components. At least one intermediate case may further be disposed between the front and the rear cases 201 and 202.

Such cases may be injected using a synthetic resin or be formed of a metal, such as stainless steel (STS), titanium (Ti) or the like.

The terminal body is shown having a front display unit 251, an audio output module 252, a camera 221 and the like provided on the front case 201. Also, a microphone 222, a side input unit 232, an interface unit 270, and the like may be disposed on side surfaces of the front case 201 and the rear case 202.

The front display unit 251 may occupy most of a principal surface of the front case 201. That is, the front display unit 251 may be disposed on a front surface of the terminal and display visual information. The audio output module 252 and the camera 221 may be disposed near one of both end portions of the front display unit 251, and a front input unit 231 and the microphone 222 may be disposed near the other end portion of the front display unit 251.

The front input unit 231 is one example of the user input unit 130 (see FIG. 1) and may include a plurality of manipulation units. The manipulation units may be commonly designated as a manipulating portion, and employ any method if it is implemented in a tactile manner allowing the user to perform manipulation with a tactile feeling. In this exemplary embodiment, the front input unit 231 may be implemented as a touch key. However, the present disclosure may not be limited to this. The front input unit 231 may include a push key.

Also, the front display unit 251 may form a touch screen together with a touch sensor. In this structure, the touch screen may serve as a user input unit 130. Accordingly, the front surface of the mobile terminal 200 may be implemented in a form factor that the front input unit 231 is not disposed below the front surface of the terminal. Here, the mobile terminal 200 may be configured such that an input manipulation with respect to the terminal main body may be allowed only through the front display unit 251 and a rear input unit 232 to be explained later.

As another example of the user input unit 130, a side input unit 232 may allow a user to input a command, such as adjusting volume of sounds output through the audio output module 252, converting the front display unit 251 into a touch recognition mode, or the like.

Referring to FIG. 2B, the rear surface, namely, the rear case 202 of the terminal body is further shown having a camera module 221'. The camera module 221' faces a direction which is substantially opposite to a direction faced by the camera module 221 (see FIG. 2A). Also, the camera module 221' may be a camera having different pixels from those of the camera module 221.

For example, the camera module 221 may operate with relatively lower pixels (lower resolution). Thus, the camera module 221 may be useful when a user can capture his face and send it to another party during a video call or the like. On the other hand, the camera module 221' may operate with relatively higher pixels (higher resolution) such that it can be useful for a user to obtain higher quality pictures for later use. The camera modules 221 and 221' may be installed in the terminal body to be rotatable or popped up.

A flash 223 and a mirror (not shown) may be disposed adjacent to the camera module 221'. The flash 223 operates in conjunction with the camera module 221' when taking a picture using the camera module 221'. The mirror can cooperate with the camera module 221' to allow a user to photograph himself in a self-portrait mode.

An audio output module 252' may further be disposed on the rear surface of the terminal body. The audio output module 252' may cooperate with the audio output unit 252 (see FIG. 2A) to provide stereo output in a phone-call mode, and be used to implement a speakerphone mode during a call connection.

The terminal body is shown having a power supply unit 290 for supplying power to the mobile terminal 200. The power supply unit 290 may be mounted inside the terminal body or detachably coupled to the terminal body.

As illustrated, a rear input unit 233 may be disposed on the rear surface of the terminal body. The rear input unit 233, for example, may be located adjacent to the camera module 221'.

The rear input unit 233 may be manipulated by a user to input a command for controlling an operation of the mobile terminal 200, and set to allow inputting of various contents. For example, the rear input unit 233 may allow a user to input commands, such as power on or off, START, END, SCROLL or the like, volume adjustment of sounds output from the audio output modules 252 and 252', or conversion of the display unit 251 into a touch recognition mode, or the like.

The rear input unit 233 according to the present disclosure may be configured to receive an input in a pushing manner. Hereinafter, the configuration of the rear input unit 233 will be described in more detail.

Figure 3:
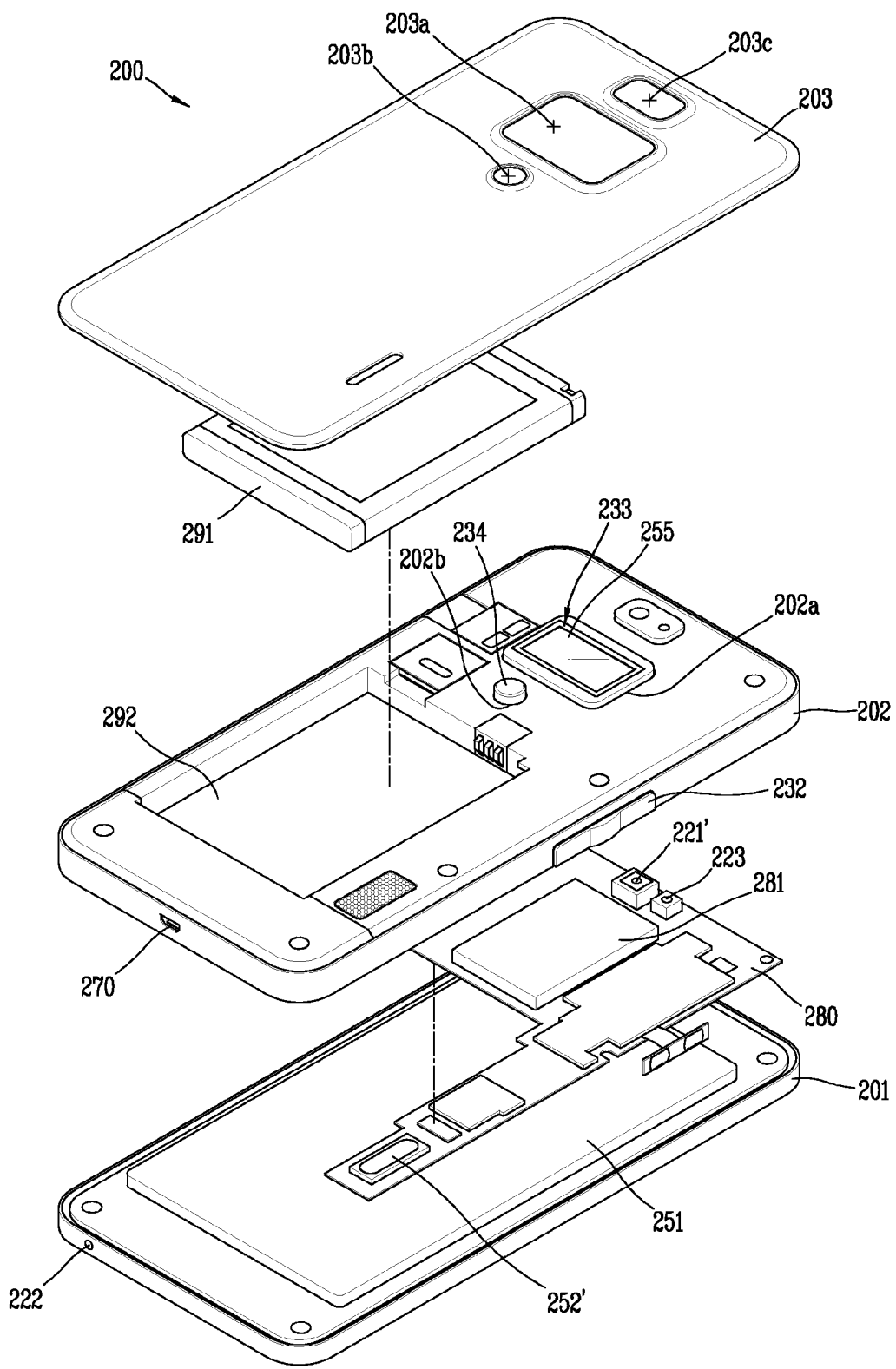
FIG. 3 is a disassembled view of the mobile terminal of FIG. 2B.

FIG. 3 is a disassembled view of the mobile terminal 200 of FIG. 2B.

As illustrated in FIG. 3, a printed circuit board (PCB) 280 may be mounted in the terminal body. The PCB 280, for example, may be mounted to the front case 201 or the rear case 202, or mounted to a separate structure. The separate structure may be a middle case (not shown). Hereinafter, description will be given of an example that the front case 201 and the rear case 202 are separately provided, but the present disclosure may not be limited to this structure. The cases 201 and 202 may also be integrally formed with each other.

The PCB 280 may be implemented as one example of the controller 180 (see FIG. 1) which controls various functions of the mobile terminal 200. The PCB 280 may also be provided in plurality, and the plurality of PCBs 280 may be combined to execute the function of the controller 180. Various electronic elements may be mounted on the PCB 280 for executing such functions.

The rear case 202 may include a batter accommodating portion 292 for accommodation of the battery 291 therein. A battery cover 203 may be detachably coupled to the rear case 202 to cover the battery accommodating portion 292. Unlike the detachable structure, the battery 291 may be mounted in the terminal to be non-detachable.

Still referring to FIG. 3, the camera module 221' may be electrically connected to the PCB 280. The camera module 221' may have a lens part for photographing an image through a lens. The camera module 221' may be exposed to the rear surface of the terminal body to photograph an external image of the rear surface.

A rear input unit 233 which is manipulated by a user to input a control command may be disposed on the rear surface of the terminal body. Through holes 202a and 203a corresponding to the rear input unit 233 may be formed through the rear case 202 and the battery cover 203, respectively.

The rear input unit 233 may be disposed to overlap a front display unit 251 located on the front surface in a thickness direction of the terminal body. As one example, the rear input unit 233 may be disposed on an upper portion of the rear surface of the terminal body so as to facilitate a user to manipulate the rear input unit 233 using a forefinger when the user grabs the terminal body with one hand. Here, the present disclosure may not be limited to this, and the location of the rear input unit 233 may be changeable.

The formation of the rear input unit 233 on the rear surface of the terminal body may bring about an implementation of a new type of user interface using the rear input unit 233. Also, the rear input unit 233 may replace at least some of functions of keys which have been disposed on the front surface before. Accordingly, the front display unit 251 on the front surface may be implemented into a larger screen when the front input unit 231 is not disposed on the front surface.

Hereinafter, a detailed structure of the rear input unit 233 will be described in more detail.

Figure 4A:
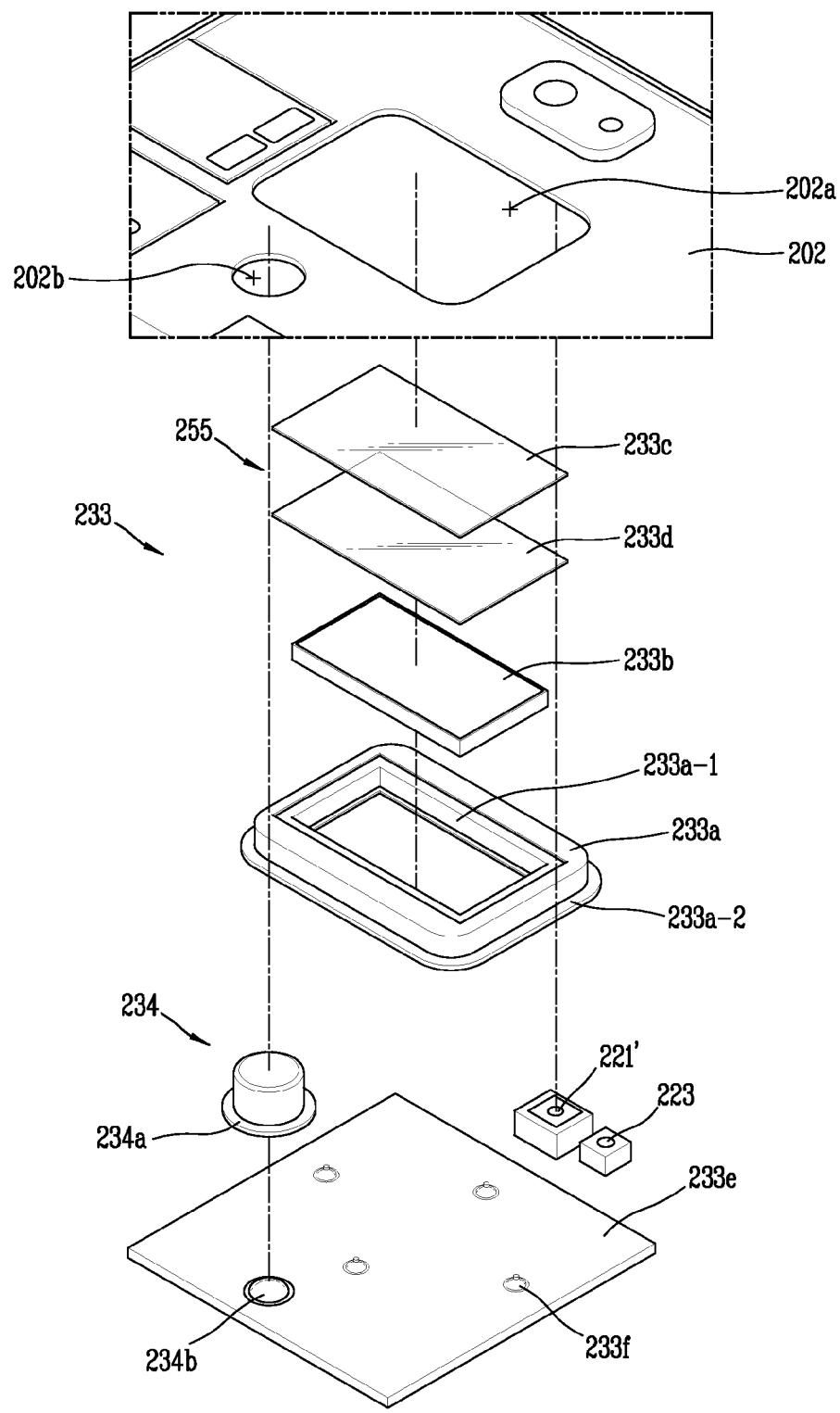
FIGS. 4A and 4B are a detailed disassembled view and a sectional view, respectively, illustrating a rear input unit illustrated in FIG. 3.
Figure 4B:
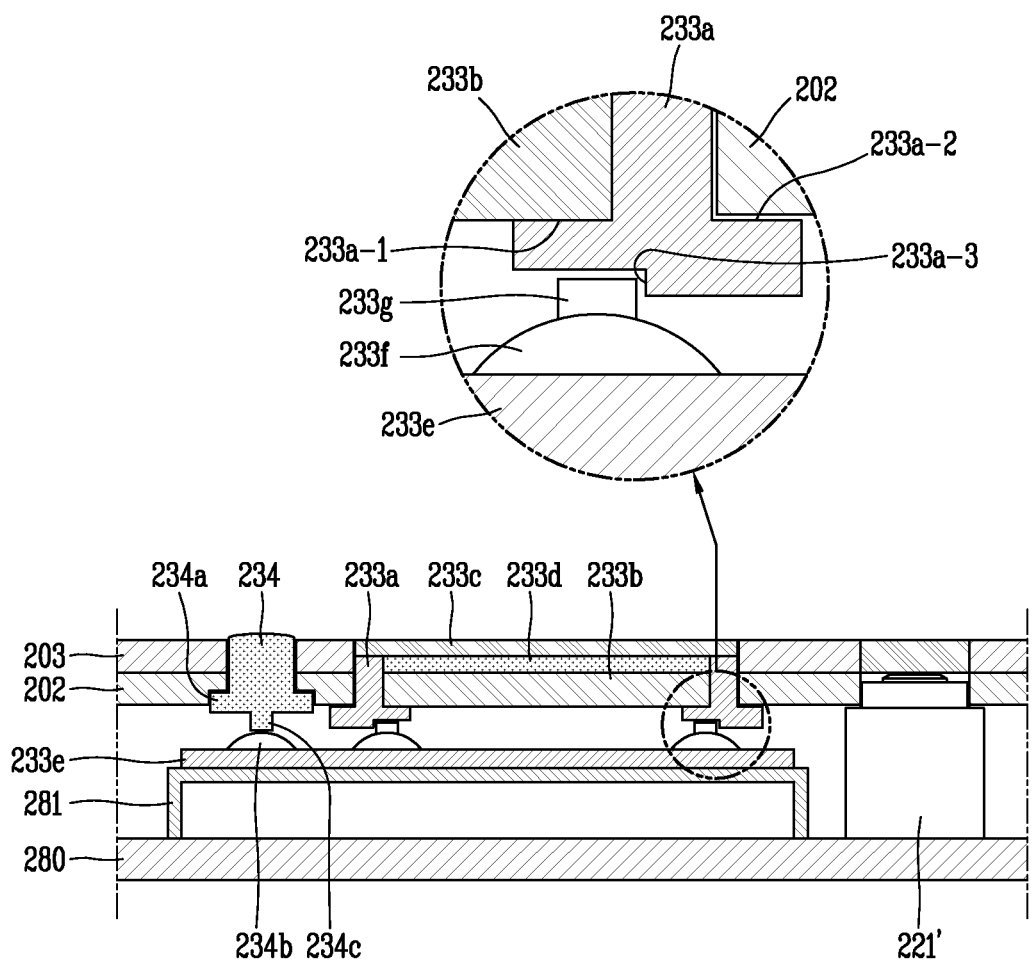

FIGS. 4A and 4B are a detailed disassembled view and a sectional view, respectively, illustrating the rear input unit 233 illustrated in FIG. 3.

Referring to FIGS. 4A and 4B with FIG. 3, the rear input unit 233 may include a frame 233a and a rear display 233b.

The frame 233a may be installed on a case of the terminal body, for example, the rear case 202 to be manipulated in a pressing manner. The pressing manipulation may include not only a manipulation by which a central portion of the frame 233a is pressed such that the whole frame 233a is pressed down, but also a manipulation by which one side of the frame 233a is pressed to be tilted. A stopping portion 233a-2 may protrude from an outer circumference of the frame 233a such that the frame 233a can be fixed onto the rear surface of the rear case 202. The frame 233a may include a mounting portion 233a-1 forming a space in which the rear display 233b is mounted.

Visual information output on the front display unit 251 may change as the frame 233a is pressed. Accordingly, the user may change the visual information by controlling the front display unit 251 in such a manner of pressing the rear frame 233a while viewing the visual information without being obscured.

This exemplary embodiment illustrates that the frame 233a is tilted to allow for a pressing manipulation. In detail, when one side of the frame 233a is pressed, the frame 233a may be tilted so as to press a side switch 233f corresponding to the one side of the frame 233a. The side switch 233f may be disposed to correspond to each edge of the frame 233a or disposed between two edges of the frame 233a. The drawings exemplarily illustrate that the frame 233a is formed in a rectangular shape, edge portions thereof corresponding to respective four sides of the rectangle are tilted, and the side switch 233f is disposed on a middle portion of each edge of the frame 233a.

The frame 233a may be configured to generate a different control command according to a tilting direction. As illustrated in FIGS. 4A and 4B, when the frame 233a is formed in the rectangular shape and edge portions corresponding to the four sides of the rectangle are tiltable, the frame 233a may function as a volume key, an up/down/left/right navigational key and the like.

The controller 180 may process a pressing manipulation of the frame 233a as a control command for a different function according to an operating mode of the mobile terminal 200. For example, in an Internet search mode, a document view mode and the like, a scroll function may be executed when the frame 233a is tilted to each of both sides in a lengthwise direction of the terminal body, and a page turn-over function may be executed when the frame 233a is tilted to each of both sides in a widthwise direction of the terminal body. On the other hand, in a music or video playback mode and the like, a function associated with volume adjustment may be executed when the frame 233a is tilted to each of both sides in the lengthwise direction of the terminal body, and a function associated with a turn-off of a playback list may be executed when the frame 233a is tilted to each of both sides in the widthwise direction of the terminal body.

A side actuator 233g which presses the side switch 233f when one side of the frame 233a is pressed may be mounted on an upper end portion of the side switch 233f. As the side actuator 233g is integrally formed with the side switch 233f, a problem that the side switch 233f is not pressed due to failing to press an accurate point of the side switch 233f when the frame 233a is tilted may be overcome. The side actuator 233g may preferably be formed of a material, such as rubber, silicon, urethane or the like, to prevent the side actuator 233g from being slipped upon coming in contact with the frame 233a.

When the side actuator 233g is pressed in response to the tilting of the frame 233a, the side actuator 233g may be affected not only by a perpendicular force applied in a perpendicular direction to press the side switch 233f but also by a force applied in a lateral direction. As a result, the frequent tilting of the frame 233a may cause durability of the side actuator 233g to be lowered. To overcome this problem, the frame 233a may include a supporting portion 233a-3 recessed into a rear surface of the frame 233a, which faces the side switch 233f, so as to partially cover an outer side of the side actuator 233g. The supporting portion 233a-3 may restrict the side actuator 233g from being deformed in a lateral direction upon the tilting of the frame 233a.

The rear display 233b may be mounted in the mounting portion 233a-1, and output visual information, which is based on an event generated in the mobile terminal 200, toward the rear surface of the terminal body. Also, the rear display 233b may be smaller in size than the front display unit 251 and display relatively brief information. For example, the rear display 233b may briefly display information related to a time, a notification of an application, an incoming call, an incoming message and the like. The rear display 233b may include other components, such as a window 233c and the like, and configure a rear display unit 255 corresponding to the front display unit 251.

The rear display 233b may output visual information in cooperation with the front display unit 251. For example, the rear display 233b may output a part of visual information which is displayed on the front display unit 251. As one example, when an incoming call is received, a phone number and, in some times, information (for example, name, photo, etc.) related to the phone number may be output on the front display unit 251 and only the name may be output on the rear display 233b.

The window 233c may be mounted onto the frame 233a to cover the rear display 233b. The window 233c may be processed to be opaque, except for a portion thereof corresponding to the rear display 233b. For example, a non-transparent material may be printed or deposited on a rear surface of the window 233c, except for the portion corresponding to the rear display 233b.

A touch sensor 233d may be located between the window 233c and the rear display 233b, to sense a touch input onto the window 233c with respect to the rear display 233b. The touch sensor 233d may be electrically connected to the PCB 280 via a connector, and implemented as a capacitive touch sensor or a constant pressure type touch sensor.

A button part 234 which is manipulated in a pressing manner may be disposed on the rear surface of the terminal body at an adjacent position to the rear input unit 233. The button part 234 may overlap the front display unit 251 in a thickness direction of the terminal body. The button part 234 may be configured to generate a control command corresponding to ON/OFF of the front display unit 251 upon being pressed. When the button part 234 is pressed for more than a preset time, a control command corresponding to ON/OFF of the mobile terminal 200 may be generated.

The button part 234 may be externally exposed through through holes 202*b* and 203*b*. A stopping portion 234*a* may protrude from an outer circumference of the button part 234 such that the button 234 can be fixed onto the rear surface of the rear case 202. A button switch 234*b*, which is pressed by a button actuator 234*c* when the button part 234 is pressed, may be disposed on a rear surface of the button part 234. The button switch 234*b* may be disposed on a flexible PCB 233*e* or a separate flexible PCB.

The flexible PCB 233*e* may be supported by a supportable inner structure, or on a shield can 281, which is installed on the PCB 280, as illustrated in FIG. 4B. The shield can 281 may cover at least one electronic element to shield an electromagnetic interface (EMI), and reinforce rigidity of the PCB 280.

Figure 5A:
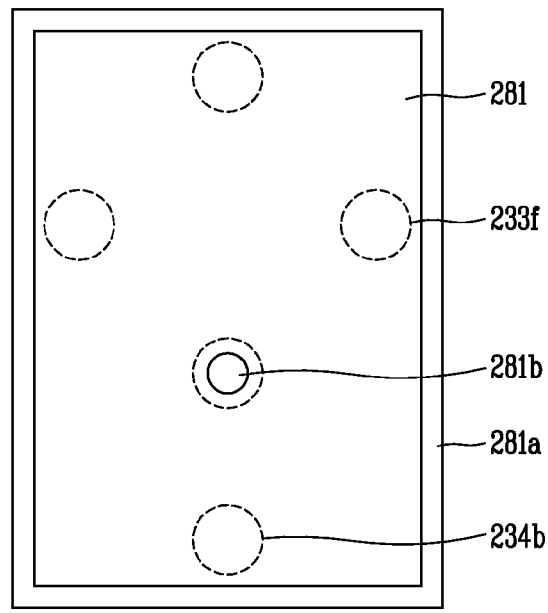
FIGS. 5A and 5B are conceptual views illustrating exemplary configurations of supporting units disposed on an inner surface of a shield can illustrated in FIG. 4A.
Figure 5B:
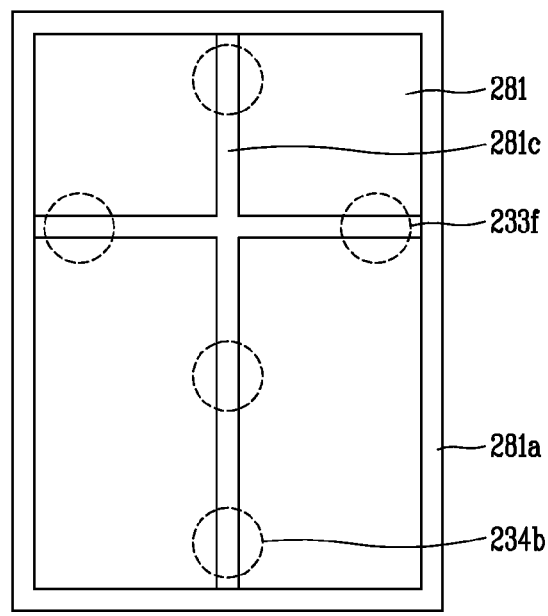

Referring to FIGS. 5A and 5B which illustrate an inner surface of the shield can 281, an end portion of the shield can 281 formed of a metal may be bent into a shape of a wall 281*a* and supported on the PCB 280.

The shield can 281 may include supporting portions 281*b* and 281*c* which protrude from the inner surface thereof to be supported on the PCB 280. The supporting portions 281*b* and 281*c* may be configured to support the side switch 233*f* and the button switch 234*b* together with the wall 281*a*. The supporting portions 281*b* and 281*c* may protrude into a shape of boss as illustrated in FIG. 5A, or protrude into a shape of bar as illustrated in FIG. 5B. The supporting portions 281*b* and 281*c* may overlap the side switch 233*f*, which is located adjacent to the button switch 234*b*, and the wall 281*a* may be disposed adjacent to the other side switch 233*f* and button switch 234*b*. Accordingly, each of the switches 233*f* and 234*b* may be firmly supported by the wall 281*a* or the supporting portions 281*b* and 281*c*.

The camera module 221' may be located at an adjacent position to the rear input unit 233. As illustrated in FIGS. 4A and 4B, the camera module 221', the rear input unit 233 and the button part 234 may be arranged in a lengthwise direction of the terminal body. The arrangement may arouse unity and accordingly a design for the rear surface of the mobile terminal 200 may be more upgraded.

FIGS. 6 to 11 are a flowchart and conceptual views, respectively, illustrating exemplary operations implemented by the mobile terminal 200 of FIG. 2B.

Figure 6:
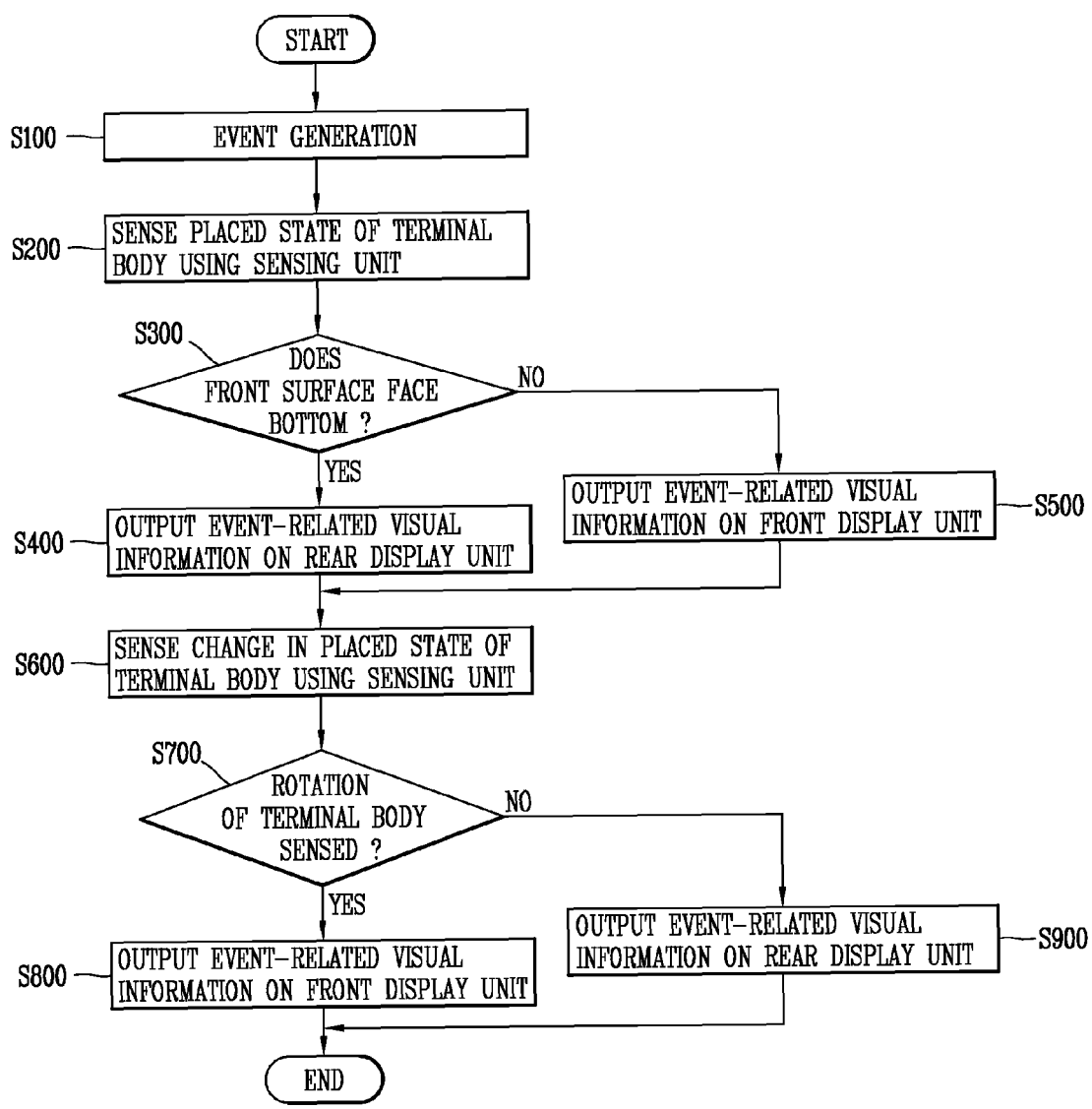
FIGS. 6 to 11 are a flowchart and conceptual views, respectively, illustrating exemplary operations implemented by the mobile terminal of FIG. 2B.

First, referring to FIG. 6, the controller 180 may control a sensor [for example, the proximity sensor 141, the light sensor 142, the gyro sensor 143, etc.] of the sensing unit 140 to sense a state that the mobile terminal 200 is placed (oriented or laid). Based on the sensed result, one of the front display unit 251 and the rear display unit 255 may be turned on and the other turned off.

For example, in a state that the mobile terminal 200 is placed such that the front surface of the mobile terminal 200 is laid on a bottom 10 and the rear surface thereof faces up, when an incoming call is received (Event generation, S100), the controller 180 may control the sensor to sense the orientation of the terminal body (S200 and S300), and control based on the sensed result the front display unit 251 to be turned off and the rear display unit 255 to output visual information related to the incoming call (S400 and S500).

In addition, when the user picks up the mobile terminal 200 to answer the incoming call, the sensing unit 140 may sense the change in the placed state of the terminal body (S600 and S700). This may be implemented in a manner that the gyro sensor 143 senses whether or not the terminal body has been rotated within a preset range. According to the sensed result, the controller 180 may control the front display unit 251 to be turned on so as to output visual information related to the event and the rear display unit 255 to be turned off (S800 and S900).

Consequently, event-related visual information upon generation of the event may be displayed only on a display which a user can easily check, resulting in minimization of power consumption.

Figure 7:
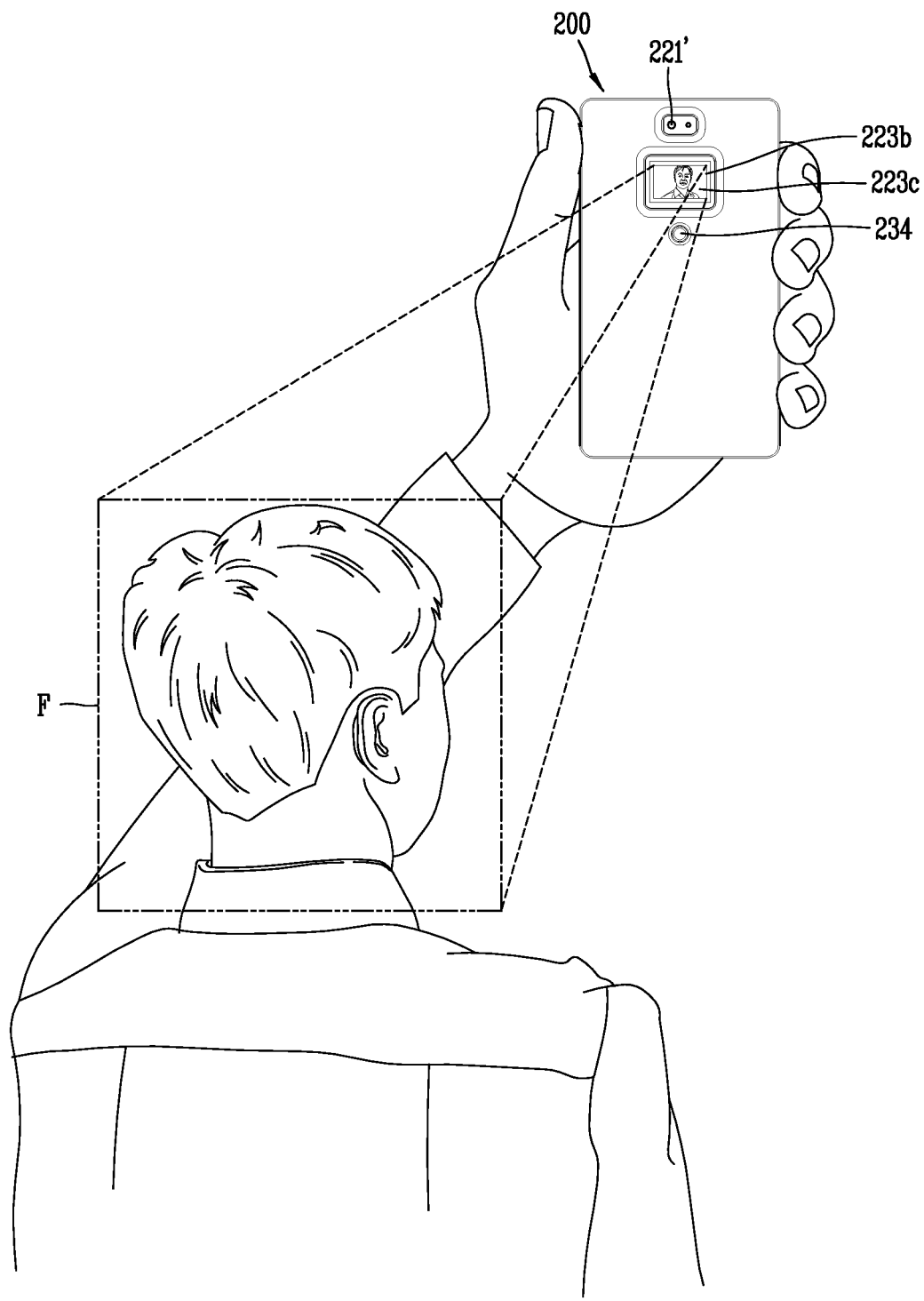

Referring to FIG. 7, upon operating the camera module 221', an image taken by the camera module 221' may be output on the rear display 233*b*. Accordingly, when the user uses the camera module 221' to photograph himself/herself in a self-portrait mode, the user may view the rear display 233*b* corresponding to a captured image frame F and hold (put) his own image, which the user wants to capture, within the image frame F.

Also, when a touch input onto the window 233*c* or a pressing input onto the button part 234 is sensed, the controller 180 may execute the capturing. Here, depending on settings, the capturing may be executed after a preset time after the touch input or pressing input is sensed.

Figure 8A:
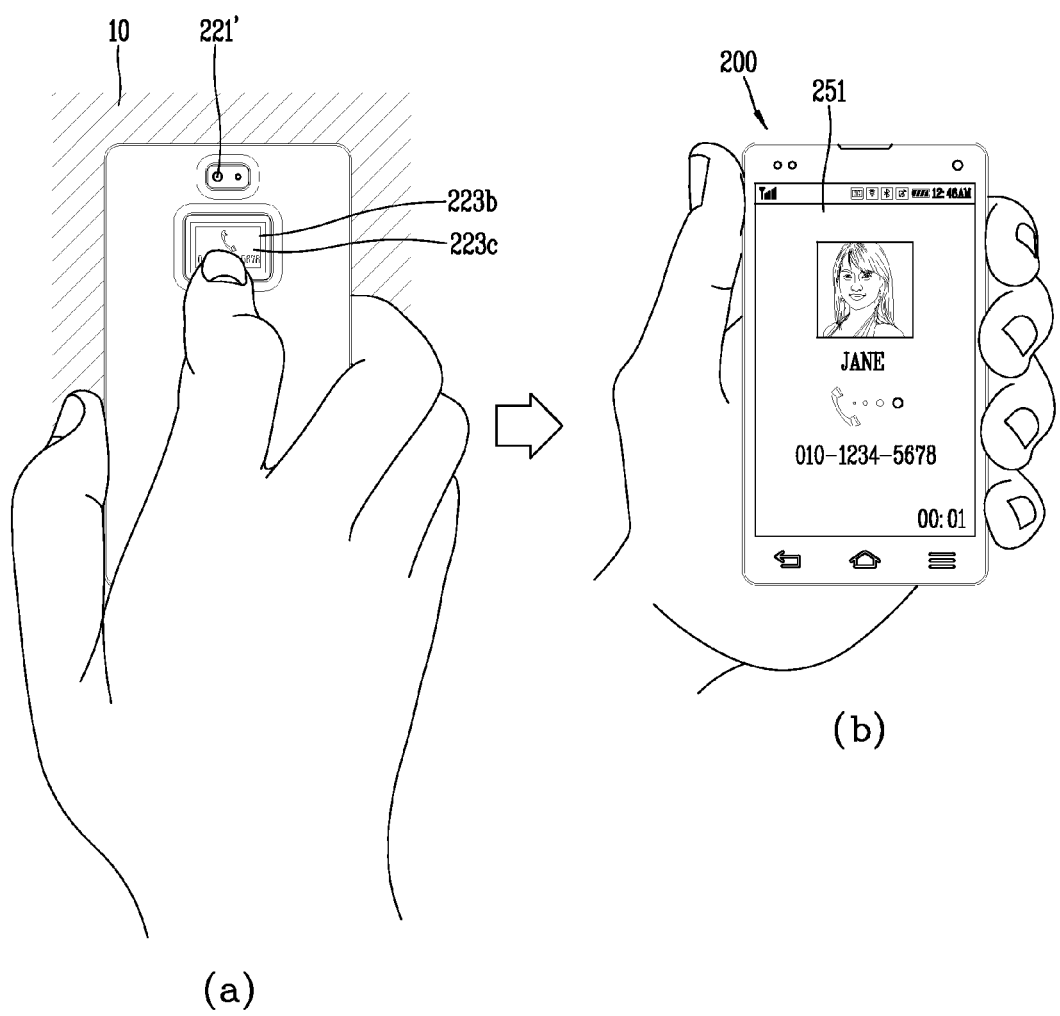
Figure 8B:
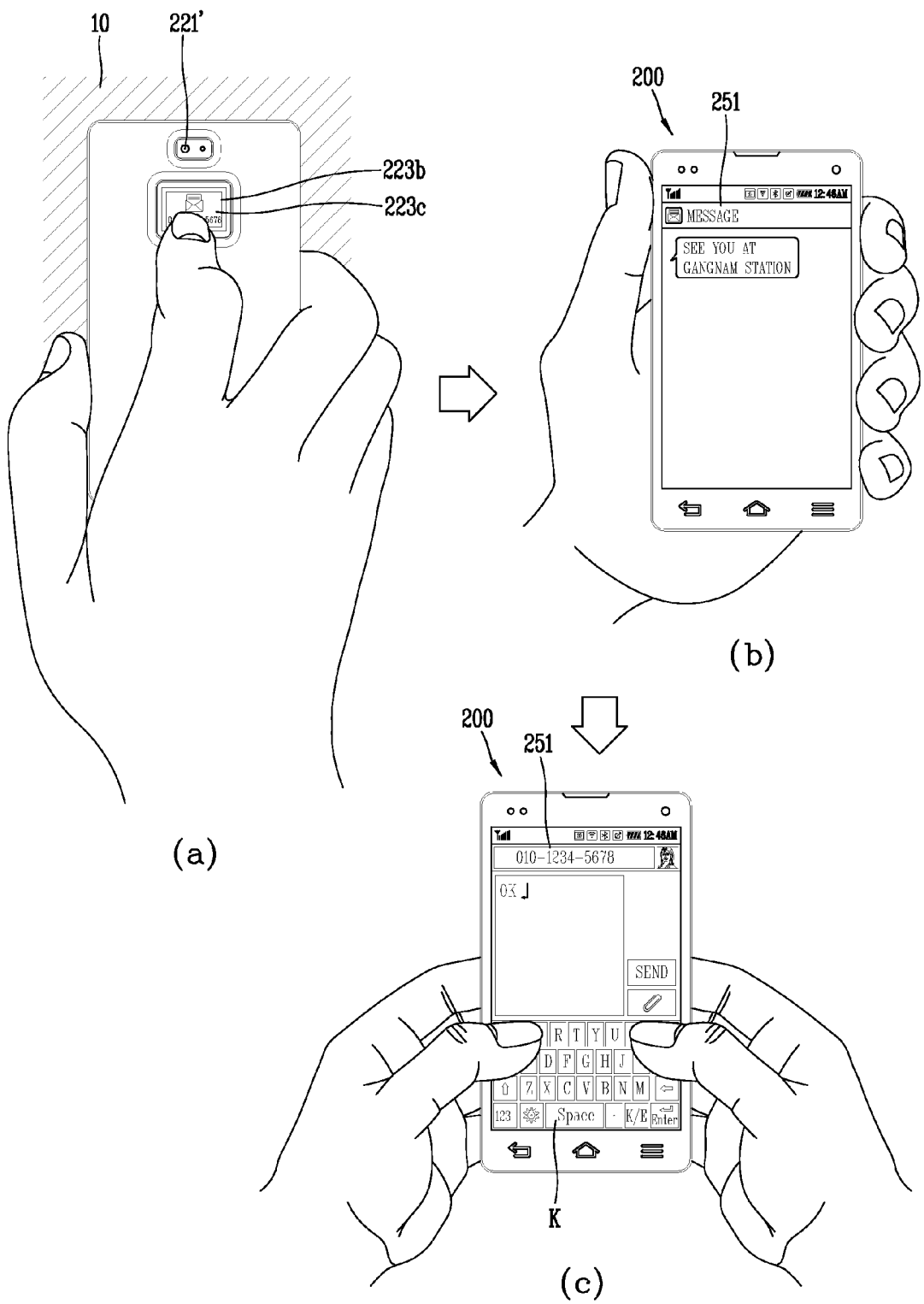

Referring to FIGS. 8A and 8B, in a state that visual information related to an event is output on the rear display 233*b*, when a touch input onto the window 233*c* is sensed by the touch sensor 233*d* and a change in a status of the terminal body is sensed by the sensing unit 140, the controller 180 may execute a function associated with the event.

For example, referring to FIG. 8A together with FIG. 6, when a call signal is received in a state that the front surface of the mobile terminal 200 is laid on the bottom 10 and the rear surface thereof faces up, visual information related to the call signal (for example, notification of a call reception, a phone number corresponding to the call signal, a name corresponding to the phone number, etc.) may be output on the rear display 233*b*. Here, the front display unit 251 may be turned off using a control mechanism of the display unit using the sensing unit 140, illustrated in FIG. 6.

When the user touches the window 233*c* (A) and grabs the terminal body such that the front display unit 251 faces up, a function associated with the event may be executed and accordingly a screen for the executed function may be output on the front display unit 251 (B). Here, the rear display 233*b* may be turned off.

While the function associated with the event is executed, when a multi-touch onto the front display unit 251 is sensed, a window related to the event may be popped up.

As one example, referring to FIG. 8B, while a message received is displayed on the front display unit 251, when a multi-touch onto the front surface 251 is sensed, a keypad K may be output to allow the user to response to the message. This may be a user interface matching a series of the user's natural motions, as illustrated in FIG. 8B, namely, touching the window 233*c* and grabbing the mobile terminal 200 with one hand (A), checking the message displayed on the front display unit 251 (B), and grabbing the mobile terminal 200 with both hands to response to the message (C). Such user interface may increase the user's convenience.

Figure 9A:
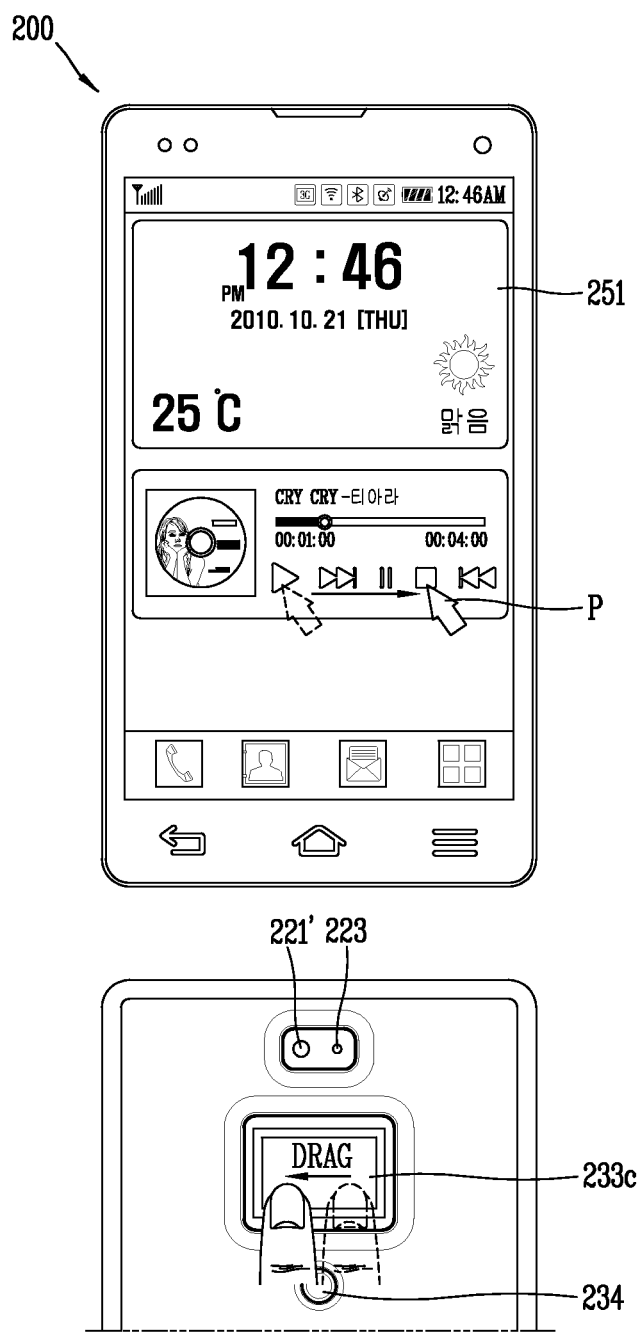

Referring to FIG. 9A, when a touch input onto the window 233*c* is sensed by the touch sensor 233*d*, a pointer P may be displayed on the front display unit 251. The pointer P may be movable along dragging on the window 233*c*. Here, when a single tap is applied onto the window 233*c*, an application, a menu or the like where the pointer P is located may be activated. A control command generated in response to the single tap may correspond to a control command generated by directly touching the front display unit 251.

Therefore, the user may be able to control the mobile terminal 200 only by touching the rear window 233c while viewing the full front display unit 251 without interruption.

Figure 9B:
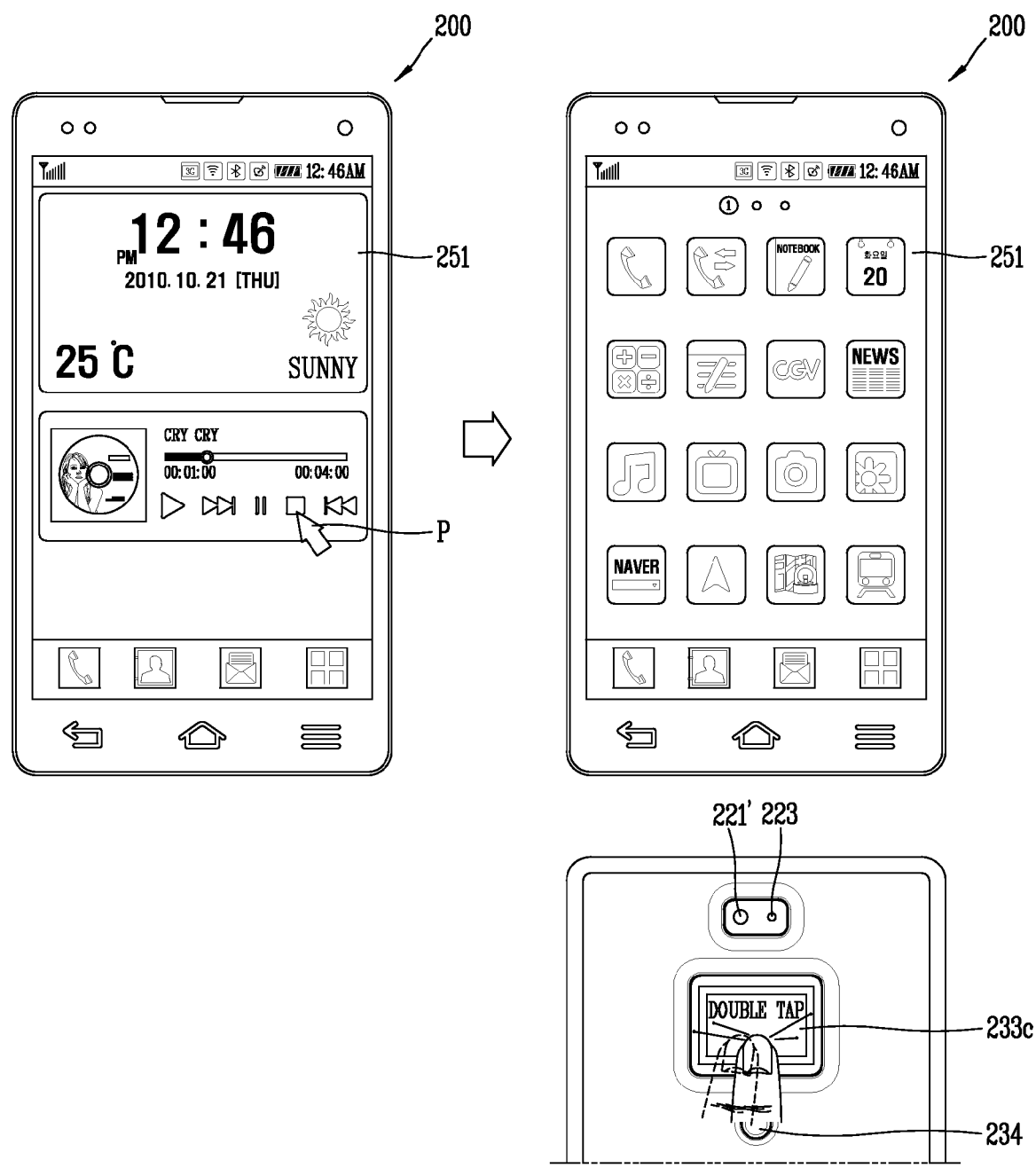

Referring to FIG. 9B, when a double tap is applied onto the window 233c, a different control command from the single tap may be generated. For example, in a state that a home screen including a weather application, frequently-used applications and the like is displayed, when a double tap is applied onto the window 233c, the home screen may be converted into a screen on which applications are arranged or a location modifying mode of an application on which the pointer P is located may be activated.

Figure 10:
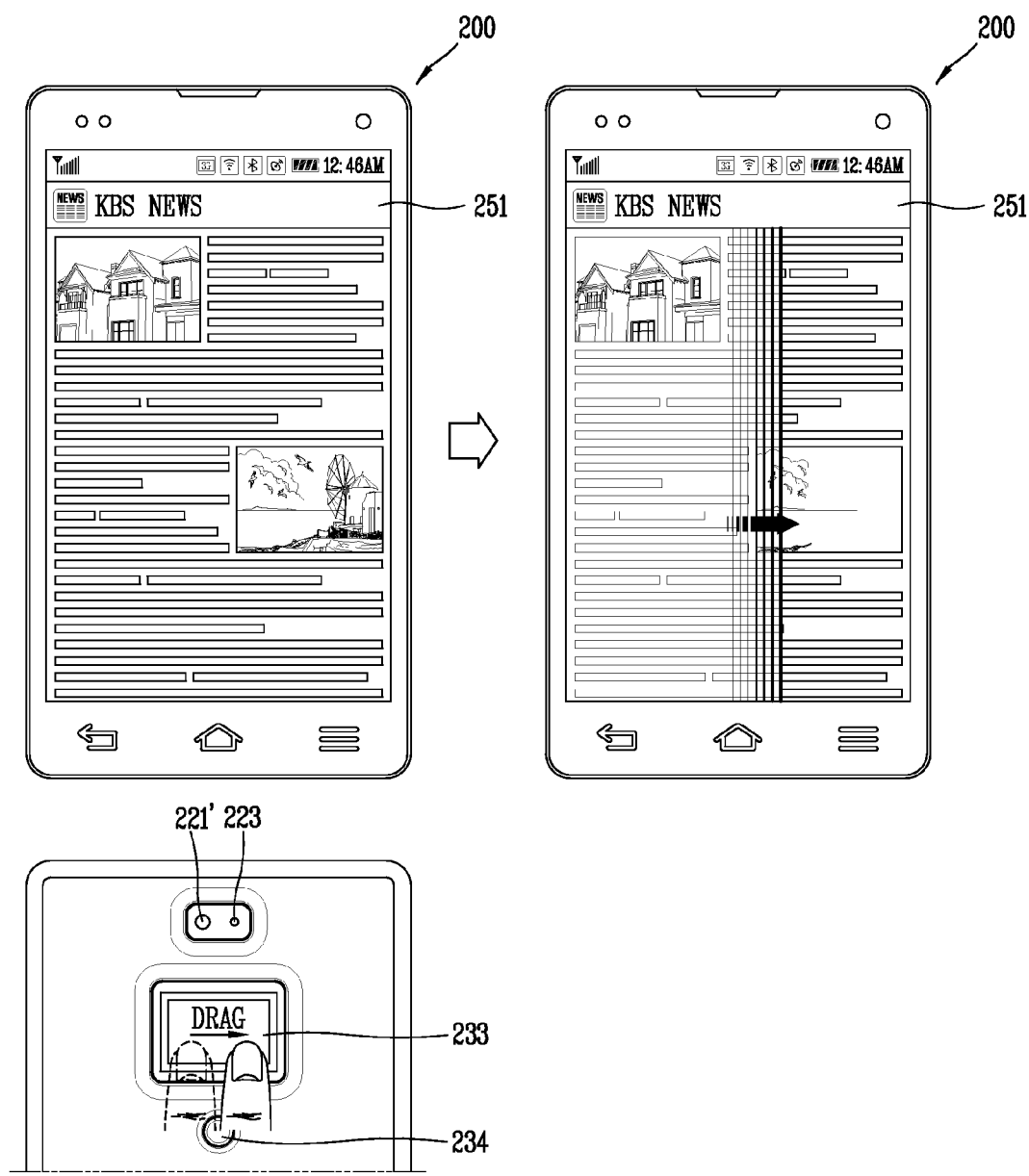

Referring to FIG. 10, when a continuous touch onto the window 233c of the rear input unit 233 is sensed, the controller 180 may capture visual information output on the front display unit 251 and store the captured image in the memory 160.

For example, when a touch (dragging) is continuously applied from one side of the window 233c to another side, a screen output on the front display unit 251 may be captured. Here, a visual effect (for example, forming scanning lines) may be provided in the dragging direction onto the captured screen while the drag input is continued.

Figure 11:
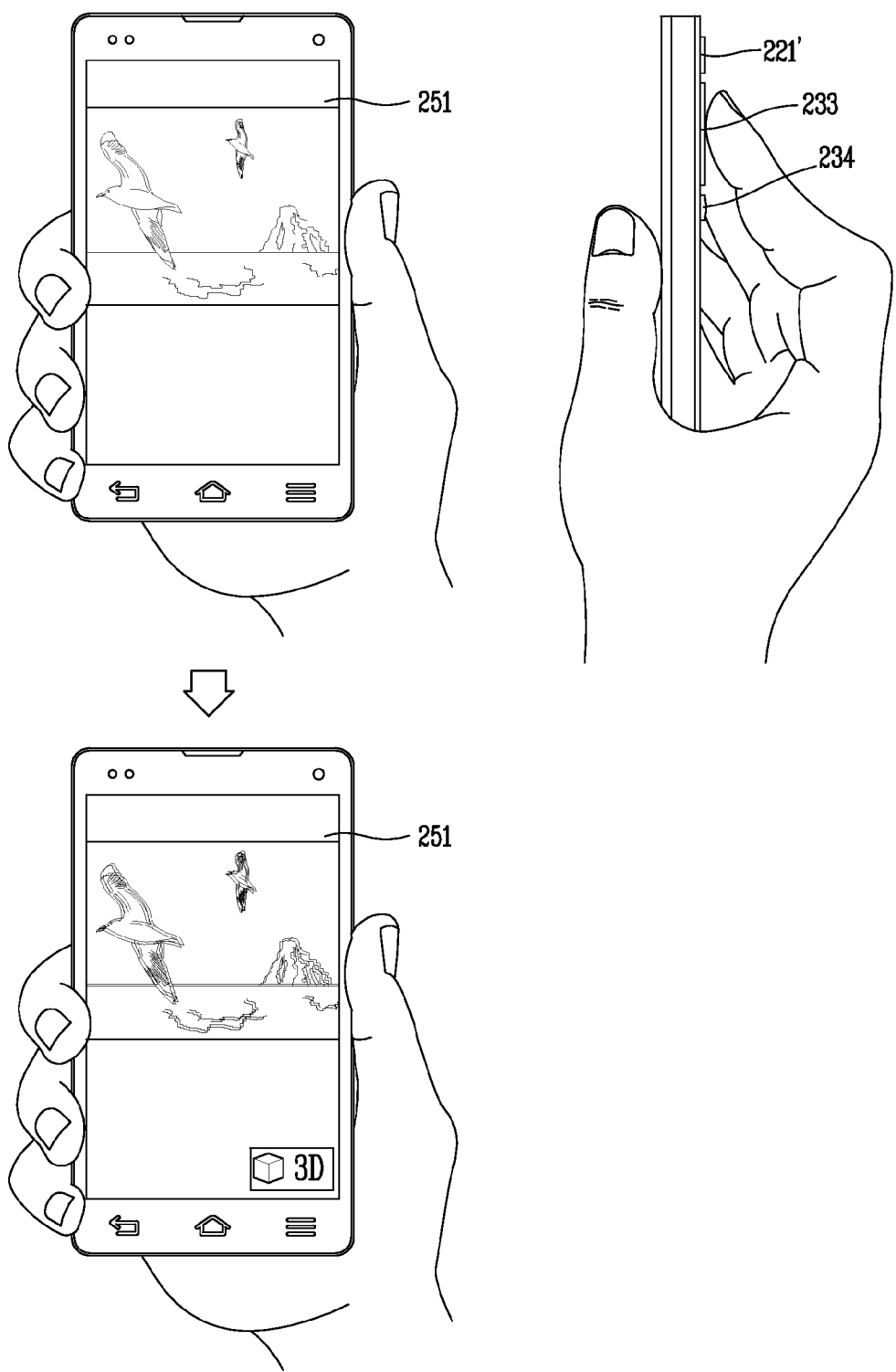

Referring to FIG. 11, when a touch input onto the front display unit 251 and a touch input onto the rear input unit 233 are simultaneously sensed, the controller 180 may generate a control command corresponding to the simultaneous touch inputs.

As one example, when the front display unit 251 and the window 233c of the rear input unit 233 are simultaneously touched, a two-dimensional (2D) image output on the front display unit 251 may be converted into a 3D image. While the 3D image is output, when the front display unit 251 and the window 233c of the rear input unit 233 are simultaneously touched again, the 3D image output on the front display unit 251 may be converted back into the 2D image.

Figure 12:
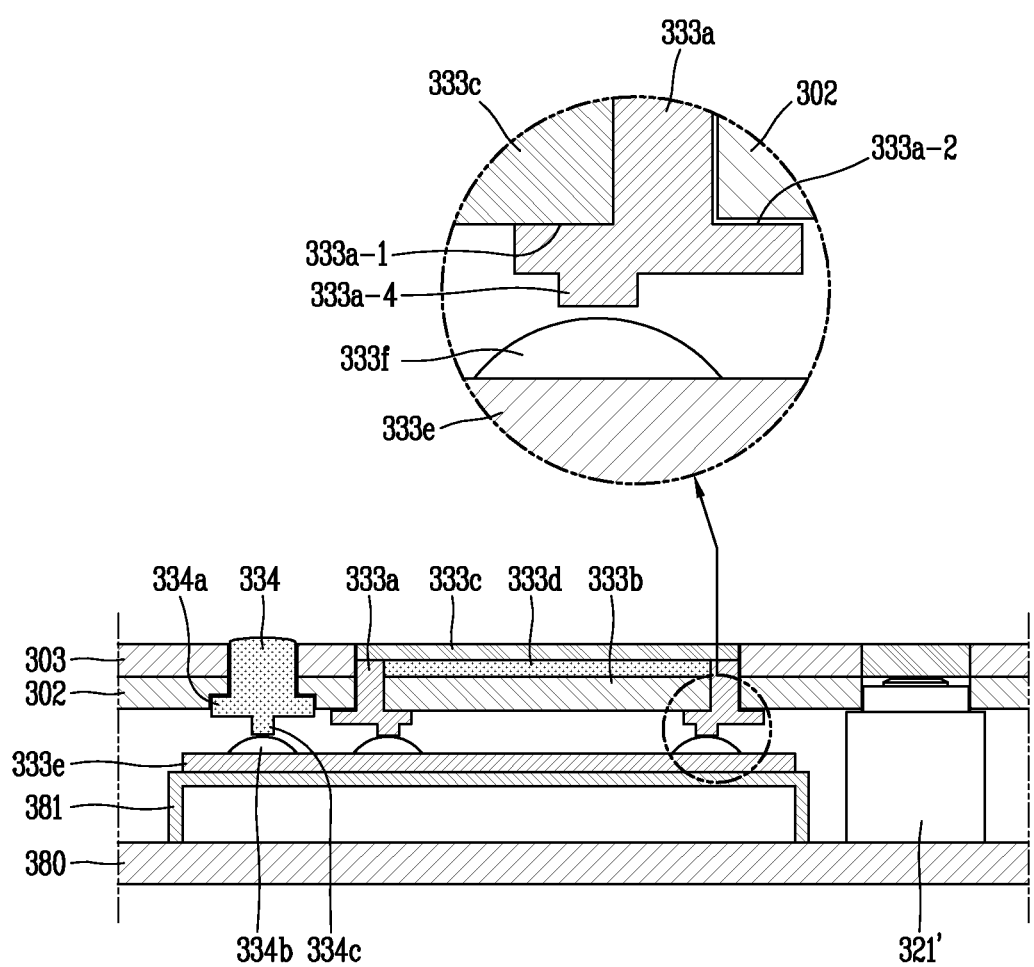
FIG. 12 is a disassembled view of a rear input unit according to another exemplary embodiment of the present disclosure.

FIG. 12 is a disassembled view of a rear input unit 333 according to another exemplary embodiment of the present disclosure.

A configuration illustrated in FIG. 12 is the same as or similar to the aforementioned configuration described in relation to FIG. 4B. However, a side actuator 333a-4 may not be disposed on a side switch 333f but protrude from a rear surface of a frame 333a. The side actuator 333a-4 may be made of synthetic resin, the same as the frame 333a, or integrally formed with the frame 333a by double-injecting rubber, silicon, urethane or the like.

Figure 13:
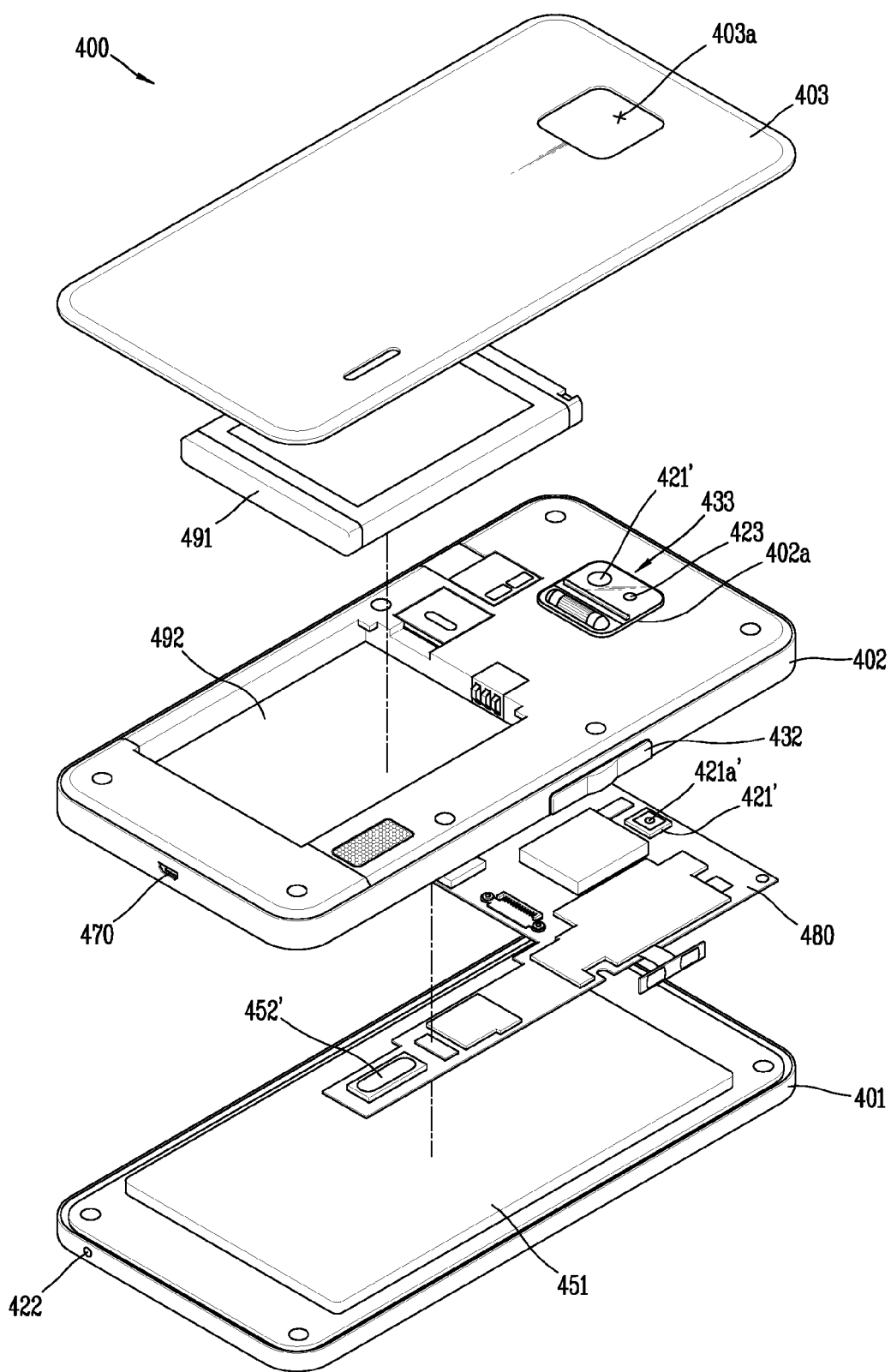
FIG. 13 is a disassembled view of a mobile terminal in accordance with another exemplary embodiment of the present disclosure.

FIG. 13 is a disassembled view of a mobile terminal 400 in accordance with another exemplary embodiment of the present disclosure.

As illustrated in FIG. 13, a PCB 480 may be mounted in the terminal body. The PCB 480, for example, may be mounted to a front case 401 or a rear case 402, or to a separate structure. The separate structure may be a middle case (not shown). Hereinafter, description will be given of an example that the front case 401 and the rear case 402 are separately provided, but the present disclosure may not be limited to this structure. The cases 401 and 402 may also be integrally formed with each other.

The PCB 480 may be may be implemented as one example of the controller 180 (see FIG. 1) which controls various functions of a mobile terminal 400. The PCB 480 may also be provided in plurality, and the plurality of PCBs 480 may be combined to execute the function of the controller 180. Various electronic elements may be mounted on the PCB 480 for executing such function.

The rear case 402 may include a batter accommodating portion 492 for accommodation of a battery 491 therein. A battery cover 403 may be detachably coupled to the rear case 402 to cover the battery accommodating portion 492. Unlike the detachable structure, the battery 491 may be mounted in the terminal to be non-detachable.

Still referring to FIG. 3, a camera module 421' may be electrically connected to the PCB 480. The camera module 421' may have a lens part 421a' for capturing an image through a lens. The camera module 421' may be exposed to the rear surface of the terminal body to capture an external image of the rear surface.

A rear input unit 433 which is manipulated by a user to input a control command may be disposed on the rear surface of the terminal body. The rear input unit 433 may be disposed to overlap a front display unit 451 located on the front surface in a thickness direction of the terminal body. As one example, the rear input unit 433 may be disposed on an upper portion of the rear surface of the terminal body. Here, the present disclosure may not be limited to this, and the location of the rear input unit 433 may be changeable. Through holes 402a and 403a corresponding to the rear input unit 433 may be formed through the rear case 402 and the battery cover 403.

The formation of the rear input unit 433 on the rear surface of the terminal body may bring about an implementation of a new type of user interface using the rear input unit 433. Hereinafter, a detailed structure of the rear input unit 433 will be described in more detail.

Figure 14A:
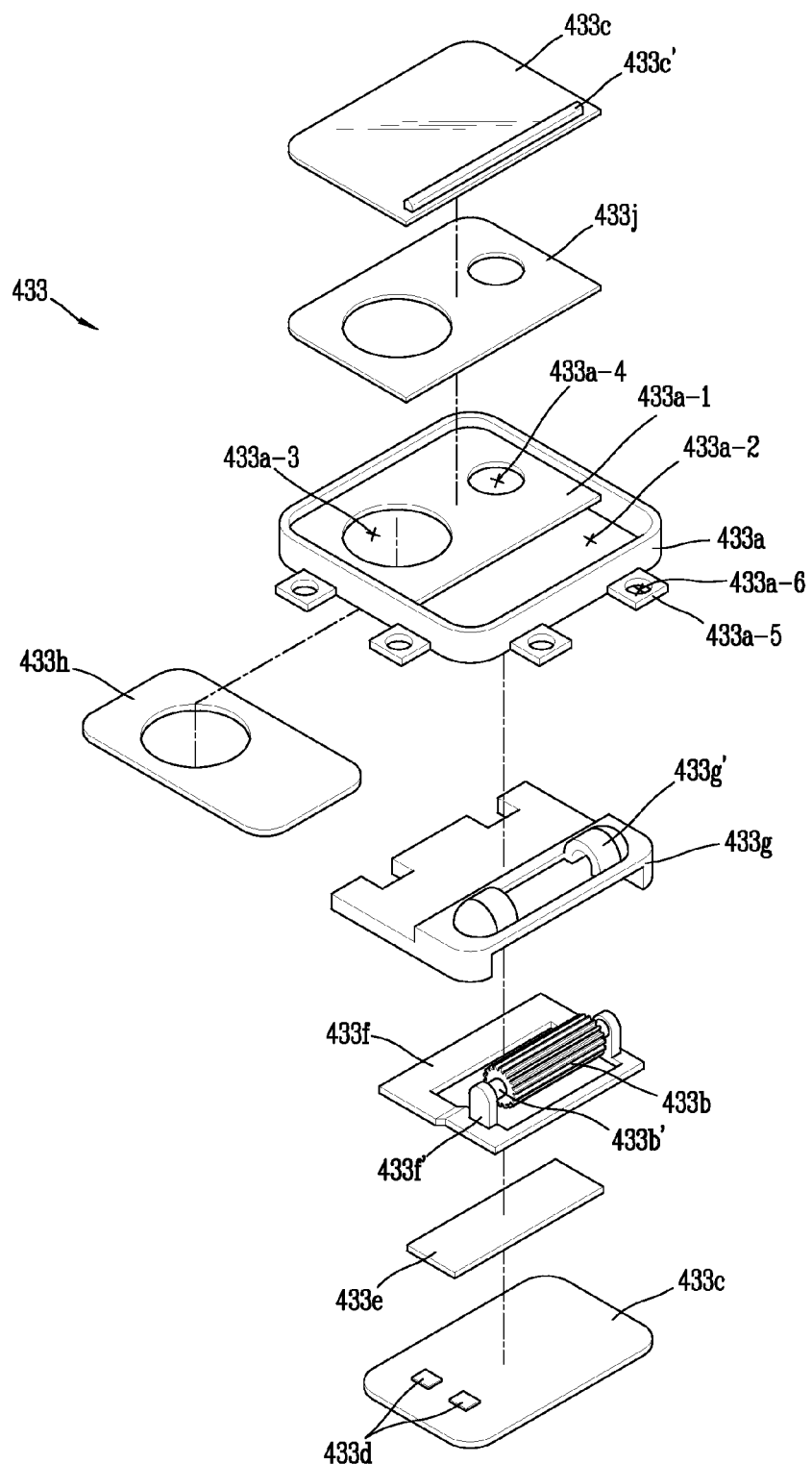
FIGS. 14A and 14B are a detailed disassembled view and a sectional view, respectively, illustrating a rear input unit illustrated in FIG. 13.
Figure 14B:
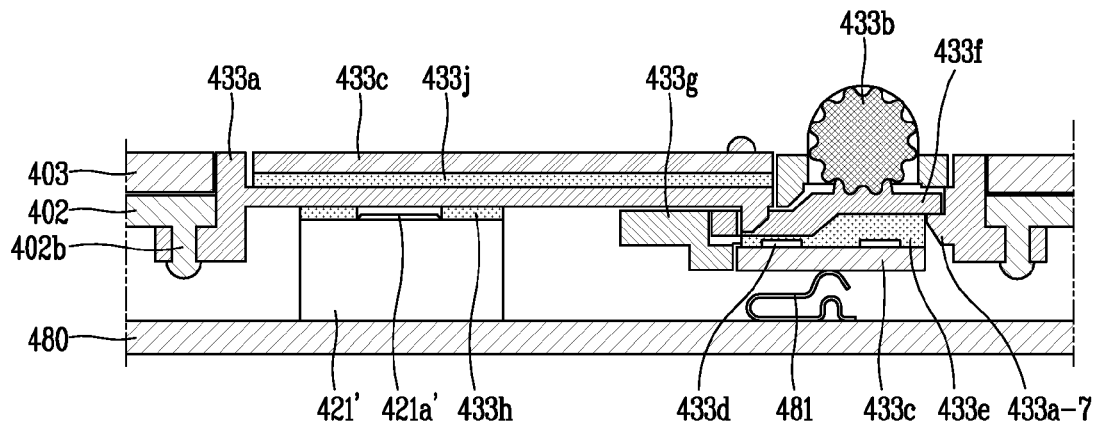

FIGS. 14A and 14B are a detailed disassembled view and a sectional view, respectively, illustrating a rear input unit 433 illustrated in FIG. 13.

Referring to FIGS. 14A and 14B together with FIG. 13, the rear input unit 433 may include a frame 433a, and a wheel key 433b and a window 433c mounted onto the frame 433a.

The frame 433a may be mounted to a case, for example, the rear case 402 of the terminal body. The frame 433a may include a mounting portion 433a-1 on which the window 433c is mounted, and a through hole 433a-2 formed through the mounting portion 433a-1 for insertion of the wheel key 433b therethrough. The mounting portion 433a-1 may be provided with a hole 433a-3 corresponding to a lens part 421a'. As illustrated, when a flash 423 is provided, a hole 433a-4 corresponding to the flash 423 may be formed through the mounting portion 433a-1. The frame 433a may be externally exposed through the through hole 403a of the battery cover 403 when the battery cover 403 is mounted. Edge portions of the externally exposed frame 433a may be flush with an upper surface of the battery cover 403, implementing a neat design for the rear surface without a stepped portion.

The wheel key 433b may be mounted to the frame 433a, and externally exposed to the rear surface through the through hole 433a-2. The wheel key 433b may be formed in a cylindrical shape and rotatable in both directions (for example, a first rotating direction and a second rotating direction opposite to the first rotating direction) centering on an axis. These drawings illustrate that the wheel key 433b is disposed such that the axis is arranged in a widthwise direction of the terminal body, but the present disclosure may not be limited to this arrangement. The axis of the wheel key 433b may be arranged in a lengthwise direction of the terminal body. A curved surface of the wheel key 433b may have a concave-convex shape to facilitate for user's manipulation thereof.

The wheel key 433b may be configured to generate a different control command according to the first or second rotating direction. Also, the controller 180 may process the rotation of the wheel key 433b as a control command with a different function according to an operating mode of the mobile terminal 400. For example, the wheel key 433b may be configured to generate control commands in relation to increase/decrease of volume, enlargement/reduction or scrolling of visual information output on the display unit 451, zoom-in/zoom-out of a capturing region upon capturing with the camera module 421', and the like, according to the rotating direction thereof.

The wheel key 433b may be arranged to overlap the display unit 451 in a thickness direction of the terminal body. As one example, the wheel key 433b may be disposed on an upper portion of a rear surface of the terminal body so that a user can easily manipulate the wheel key 433b using a forefinger when the user grabs the terminal body with one hand. As aforementioned, visual information output on the display unit 451 may change in response to the rotation of the wheel key 433b. Accordingly, the user may change visual information output on the front display unit 451 by controlling the display unit 451 in such a manner of manipulating the rear wheel key 433b while viewing the visual information without interruption.

The rotating direction of the wheel key 433b may be detected by a magnetic member 433b' disposed on the wheel key 433b and divided into N-pole and S-pole, and a plurality of hall ICs 233d disposed adjacent to the magnetic member 433b'. In the drawings, the magnetic member 433b' is disposed on one end of the wheel key 433b and the two hall ICs 433d are disposed adjacent to both sides of the magnetic member 433b', so as to detect the rotating direction of the wheel key 433b based on changes in magnetism due to the magnetic member 433b' sensed by each of the hall ICs 433d.

The hall ICs 433d may be mounted on a flexible PCB 433c and electrically connected to the PCB 480. A C-clip 281 may be used for electric connection between the PCB 480 and the flexible PCB 480 which are spatially separated from each other. For example, the C-clip 481 which is bent into a shape of 'C' may be mounted onto the PCB 480 to be electrically contactable with the flexible PCB 433c disposed on the PCB 480.

The window 433c may be made of a transparent material and mounted on the mounting portion 433a-1 to cover the hole 433a-3 corresponding to the lens part 421a'. That is, the window 433c may protect the lens part 421a' by covering the hole 433a-3. According to the structure, the lens part 421a' and the wheel key 433b may be located within the frame 433a, which defines an appearance of the rear input unit 433. This may realize a more simplified design for the rear surface of the terminal body. Also, for the structure with the flash 423 as illustrated, the window 433c may cover the hole 433a-4 corresponding to the flash 423.

The window 433c may be processed to be opaque except for a portion corresponding to the holes 433a-3 and 433a-4. For example, a non-transparent material may be printed or deposited on the rear surface of the window 433c, except for the portion corresponding to the holes 433a-3 and 433a-4. The window 433c may be firmly coupled to the mounting portion by an adhesive member 433j.

A raised spot 433c' may protrude from one side of the window 433c adjacent to the wheel key 433b. Accordingly, the user can intuitively distinguish the portions corresponding to the wheel key 433b and the lens part 421a' by tactile sensation which the user feels when a finger touches the raised spot 433c'. This may prevent the user from leaving a fingerprint on the lens part 421a' due to touching the lens part 421a' while manipulating the wheel key 433b. Here, the raised spot 433c' may not always be located only on the window 433c. The raised spot 433c' may be formed anywhere if it protrudes between the lens part 421a' and the wheel key 433b. For example, the raised spot 433c' may protrude from the frame 433a.

A pad 433h, which comes in contact with the camera module 421' to prevent introduction of foreign materials into the lens part 421a', may be disposed on the rear surface of the mounting portion 433a-1. The pad 433h may be formed of an elastic material, such as silicon, rubber or the like. Hence, when the frame 433a is mounted onto the rear case 402, the pad 433h may be elastically pressed.

The rear input unit 433 may further include a base 433f and a bracket 433g.

As illustrated, the base 433f may be provided with supporting portions 433f' which are coupled to the frame 433a and rotatably support both ends of the wheel keys 433b. The flexible PCB 433c having the hall ICs 433d mounted thereto may be secured to the supporting portions 433f' by use of a conductive adhesive member 433e. The conductive adhesive member 433e may be implemented into various forms, such as an adhesive, a tape, a form pad and the like.

The bracket 433g may include a cover 433g' coupled thereto to cover the supporting portions 433f'. At least a part of the bracket 433g including the cover 433g' may be externally exposed through the through hole 433a-2 of the frame 433a.

According to the configuration, the rear input unit 433 may bring about an implementation of a new type of user interface using the rear input unit 433. Also, the rear input unit 433 may replace at least some of functions of keys which have been disposed on the front surface before. Accordingly, the front display unit 451 on the front surface may be implemented into a larger screen when the front input unit 431 is not disposed on the front surface.

Figure 15:
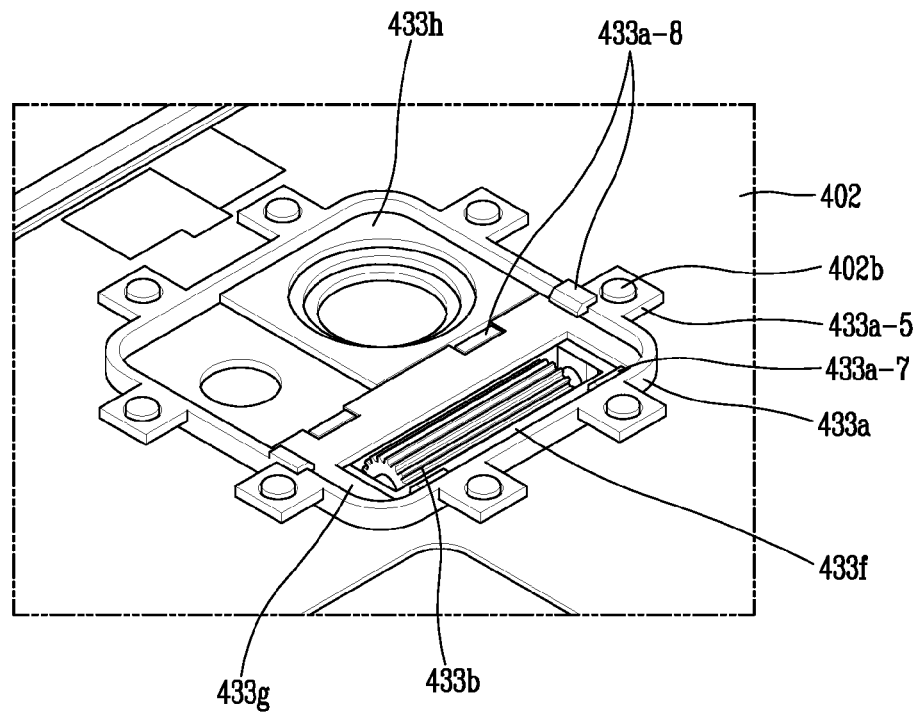
FIG. 15 is a conceptual view illustrating a state that a frame illustrated in FIG. 14A is coupled to an inner side of a rear case.

FIG. 15 is a conceptual view illustrating a state that the frame 433a illustrated in FIG. 14A is coupled to an inner side of the rear case 402.

As illustrated in FIG. 15, the frame 433a may have a structure for fixing the base 433f and the bracket 433g. As one example, the frame 433c may include first hooks 433a-7 on which the base 433f is held (hooked) so as to be supported, and second hooks 433a-8 on which the bracket 433g is held (hooked) so to be supported. The first hooks 433a-7 may protrude from an inner wall of the frame 433a, which forms the through hole 433a-2.

In addition, referring to FIG. 15 together with FIG. 14A, the frame 433a may include a plurality of coupling portions 433a-5 with coupling holes 433a-6. This illustrates that the plurality of coupling portions 433a-5 protrude from an outer circumference of the frame 433a. The frame 433a may be firmly fixed to the rear case 402 in such a manner that bosses 402b protruding from the rear case 402 are welded after being inserted into the coupling holes 433a-6.

Figure 16:
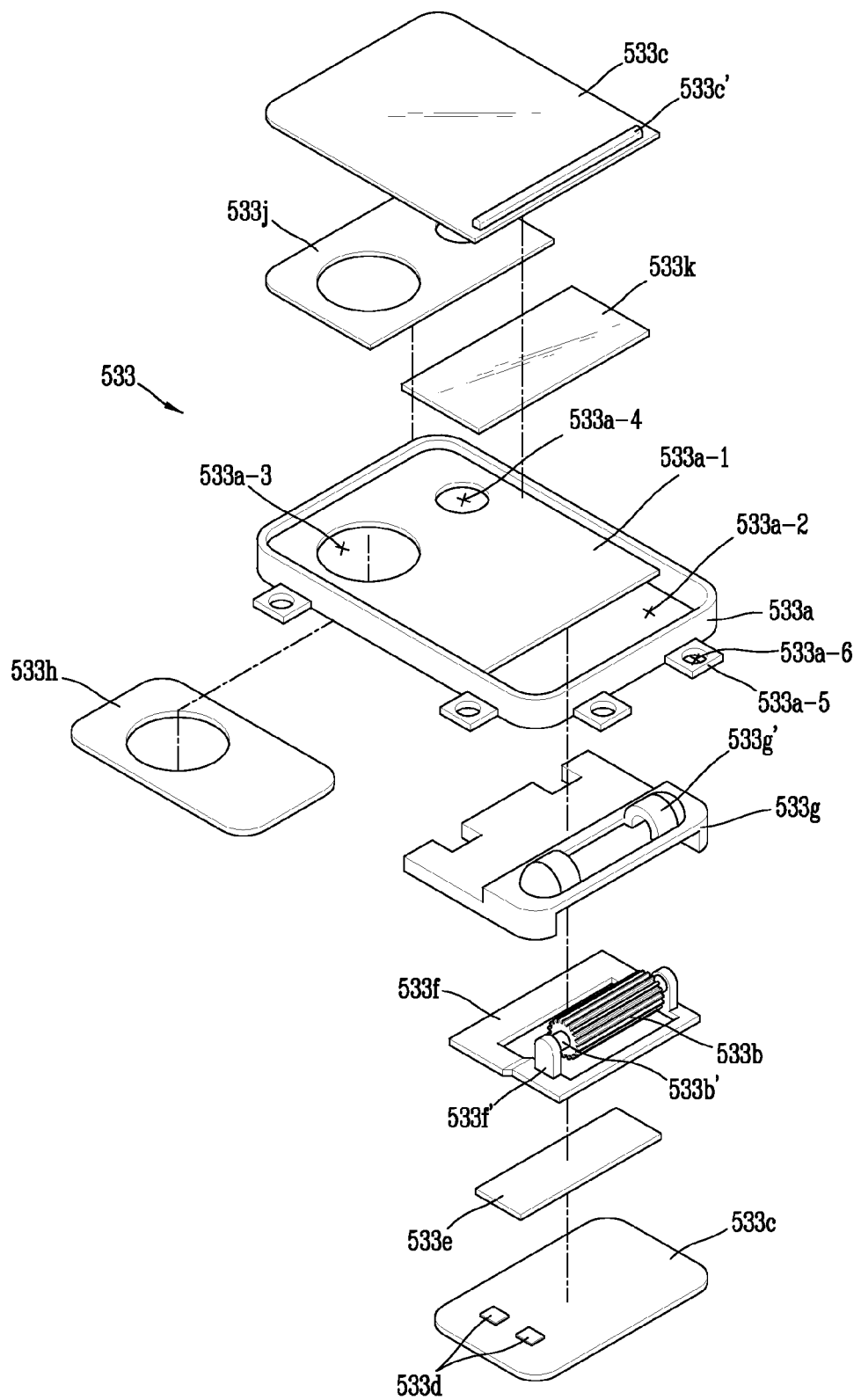
FIG. 16 is a disassembled view of a rear input unit according to another exemplary embodiment of the present disclosure.

FIG. 16 is a disassembled view of a rear input unit 533 according to another exemplary embodiment of the present disclosure.

As illustrated in FIG. 16, a rear input unit 533 may further include a rear display 533k on which visual information is output toward the rear surface of the terminal body. The rear display 533k may be mounted onto a frame 533a and covered by a window 533c. The rear display 533k may configure a rear display unit corresponding to a front display unit on the front surface of the terminal body. The rear display 533k may be located between a front camera module and a wheel key 533b within the frame 533a, and overlap the front display unit on a front surface of a terminal body in a thickness direction of the terminal body.

The rear display 533k may be configured to output relatively brief visual information, such as a clock, an alarm, the weather, a status, a notification and the like. The visual information output on the rear display 533k may change in response to rotation of the wheel key 533b. For example, while visual information related to a clock function is output on the rear display 533k, when the wheel key 533b is rotated, visual information related to different functions, such as an alarm, the weather and the like may be output.

As such, when the rear display 533k is provided to the rear input unit 533, the rear input unit 533 which can be manipulated and output visual information may be realized.

Figure 17A:
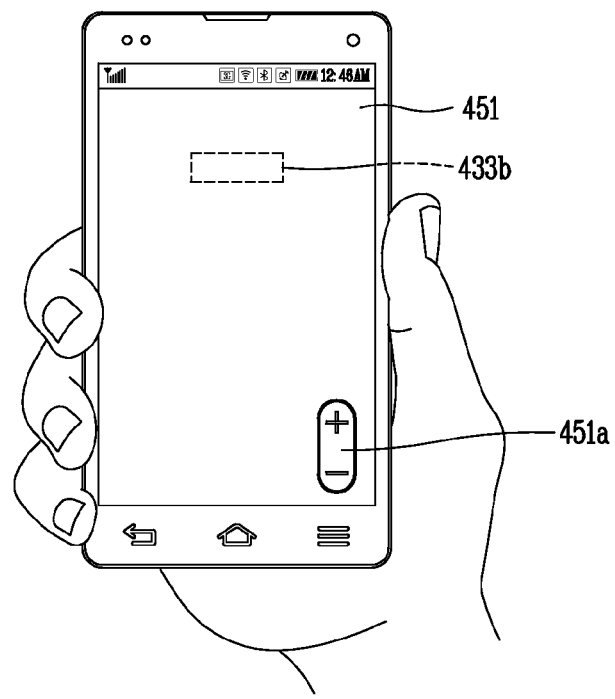
FIGS. 17A to 18 are conceptual views, respectively, illustrating exemplary operations implemented by the mobile terminal of FIG. 13.
Figure 17B:
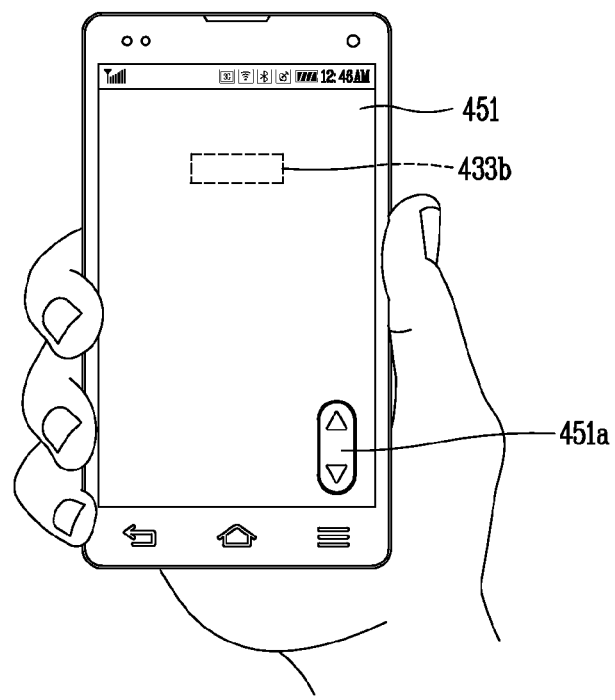
Figure 18:
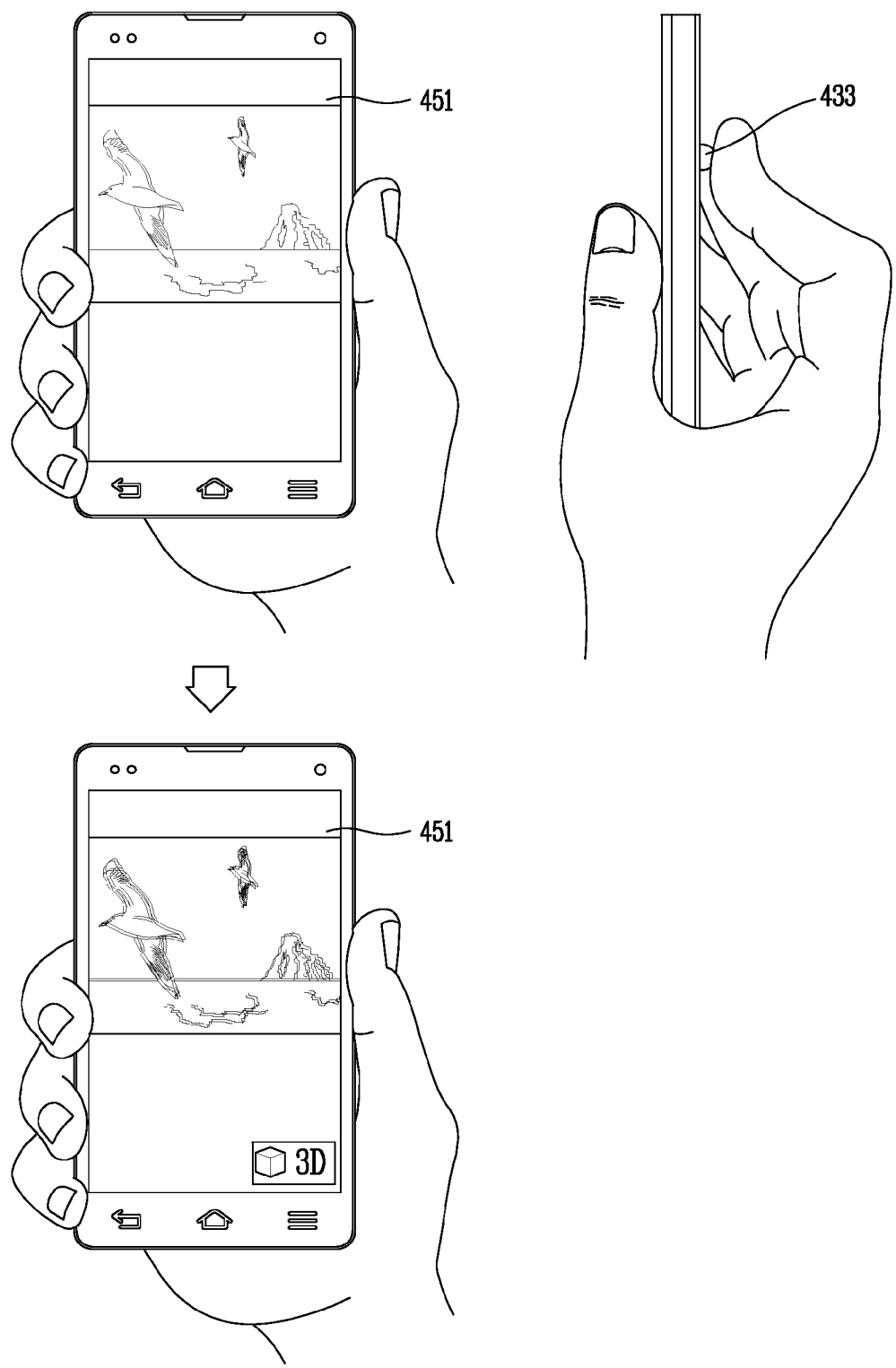

FIGS. 17A to 18 are conceptual views, respectively, illustrating exemplary operations implemented by the mobile terminal 400 of FIG. 13.

As illustrated in FIGS. 17A and 17B, information related to rotation of the wheel key 433b may be output on the display unit 451. For example, an image (hereinafter, a key image 451a) related to the rear input unit 433 may be output on the display unit 451, and an icon related to the information may be displayed within the key image 451a.

The displayed icon may be formed as a pair to correspond to the rotating directions of the wheel key 433b. For example, when a control command (for example, volume, zooming, etc.) associated with UP/DOWN is input, a pair of icons may be '+' and '−' (see FIG. 17A). The pair of icons + and − may be disposed on both ends of the key image 451a in a lengthwise direction of the key image 451a (i.e., a lengthwise direction of the terminal body). Here, a rotation of the wheel key 433b in a first rotating direction may be set to zoom-in, and a rotation of the wheel key 433b in a second rotating direction may be set to zoom-out. Also, the corresponding icon upon the rotation of the wheel key 433b may visually change.

Referring to FIG. 17B, when a webpage is output in an Internet mode, the wheel key 433b may receive a control command associated with a scroll, and the displayed icons may be related images. For example, the icons related to the scroll may be Δ and ∇.

Referring to FIG. 18, when a touch input onto the display unit 451 and the rotation of the wheel key 433b are simultaneously sensed, the controller 180 may generate a control command corresponding to the simultaneous operation.

As one example, when the wheel key 433b is rotated in the first rotating direction while the display unit 451 is touched, a 2D image output on the display unit 451 may be converted into a 3D image. On the contrary, when the wheel key 433b is rotated in the second rotating direction while the display unit 451 is touched, the 3D image output on the display unit 451 may be converted back into the 2D image.

Such user interface may vary according to different methods. For example, when the wheel key 433b is rotated and simultaneously the display unit 451 is dragged in a direction corresponding to the rotating direction, a 2D image output on the display unit 451 may be converted into a 3D image. On the contrary, when the wheel key 433b is rotated and simultaneously the display unit 451 is dragged in an opposite direction to the rotating direction, the 3D image output on the display unit 451 may be converted back into the 2D image.

Figure 19:
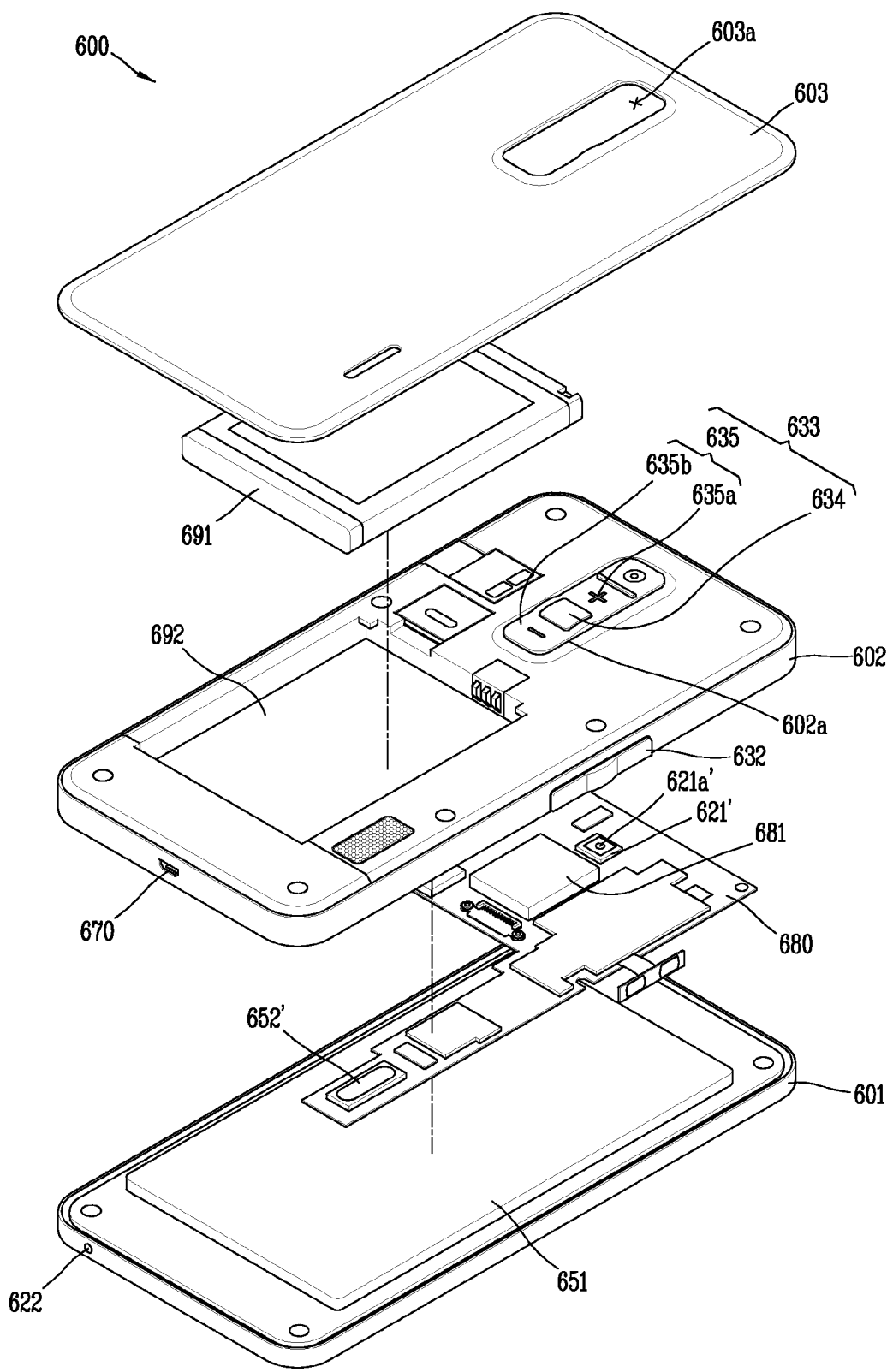
FIG. 19 is a disassembled view of a mobile terminal in accordance with another exemplary embodiment of the present disclosure.

FIG. 19 is a disassembled view of a mobile terminal 600 in accordance with another exemplary embodiment of the present disclosure.

As illustrated in FIG. 19, a PCB 680 may be mounted in the terminal body. The PCB 680, for example, may be mounted to a front case 601 or a rear case 602, or mounted to a separate structure. The separate structure may be a middle case (not shown). Hereinafter, description will be given of an example that the front case 601 and the rear case 602 are separately provided, but the present disclosure may not be limited to this structure. The cases 601 and 602 may be integrally formed with each other.

The PCB 680 may be implemented as one example of the controller 180 (see FIG. 1) which controls various functions of the mobile terminal 600. The PCB 680 may also be provided in plurality, and the plurality of PCBs 680 may be combined to execute the function of the controller 180. Various electronic elements may be mounted on the PCB 680 for executing such function.

The rear case 602 may include a batter accommodating portion 692 for accommodation of a battery 691 therein. A battery cover 603 may be detachably coupled to the rear case 602 to cover the battery accommodating portion 692. Unlike the detachable structure, the battery 691 may be mounted in the terminal to be non-detachable.

Still referring to FIG. 19, a camera module 621' may be electrically connected to the PCB 680. The camera module 621' may have a lens part 621a' for capturing an image through a lens. The camera module 621' may be exposed to the rear surface of the terminal body to capture an external image of the rear surface.

A rear input unit 633 which is manipulated by a user to input a control command may be disposed on a rear surface of the terminal body. The rear input unit 633 may be disposed to overlap a front display unit 651 located on the front surface of the terminal body in a thickness direction. As one example, the rear input unit 633 may be disposed on an upper portion of the rear surface of the terminal body. Here, the present disclosure may not be limited to this, and the location of the rear input unit 433 may be changeable. Through holes 602a and 603a corresponding to the rear input unit 633 may be formed through the rear case 402 and the battery cover 603, respectively.

The formation of the rear input unit 633 on the rear surface of the terminal body may bring about an implementation of a new type of user interface using the rear input unit 633. Also, the rear input unit 633 may replace at least some of functions of keys which have been disposed on the front surface before. Accordingly, the front display unit 651 on the front surface may be implemented into a larger screen when the front input unit 631 is not disposed on the front surface. Hereinafter, a detailed structure of the rear input unit 633 will be described in more detail.

Figure 20A:
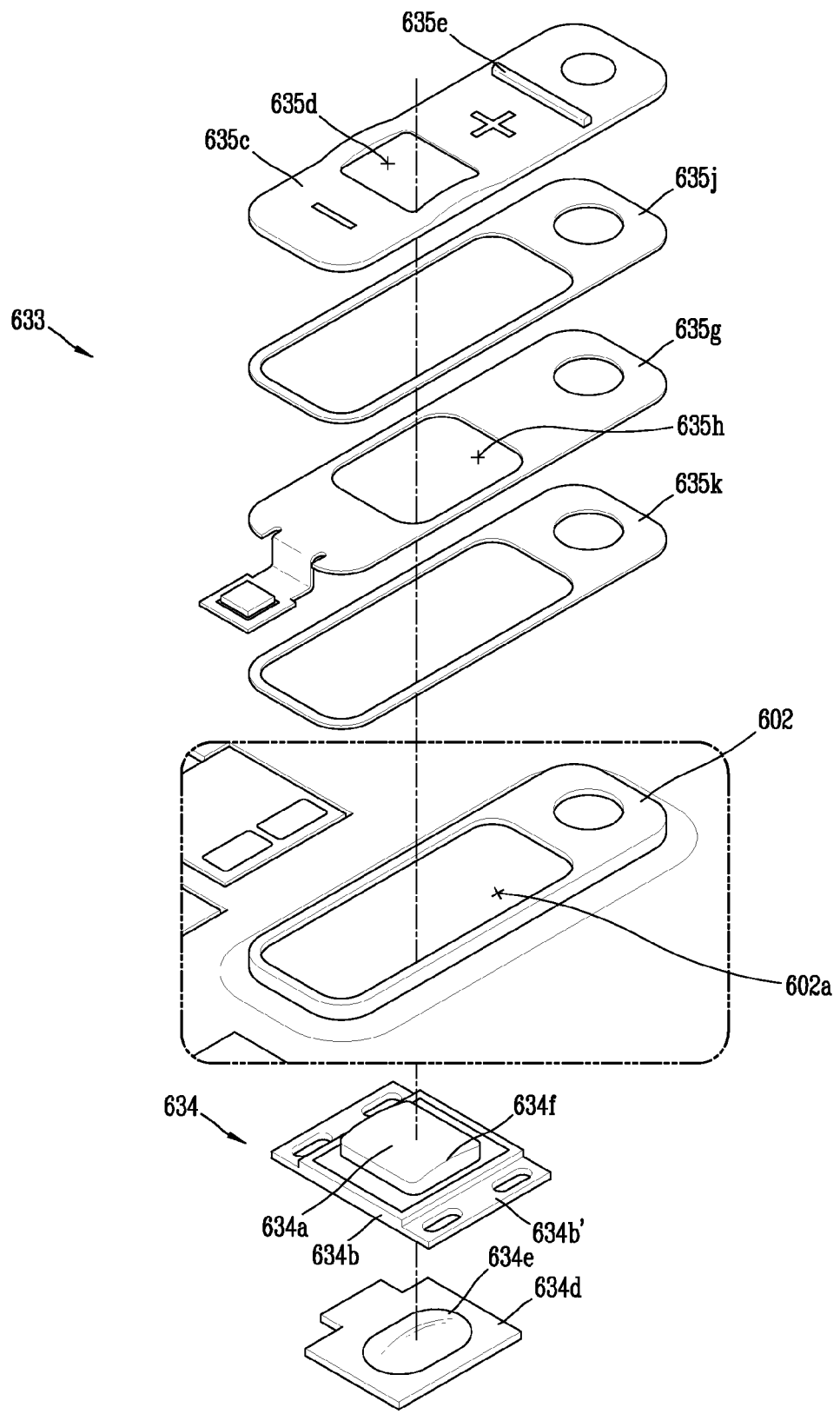
FIGS. 20A and 20B are a disassembled view and a sectional view of a rear input unit illustrated in FIG. 19.
Figure 20B:
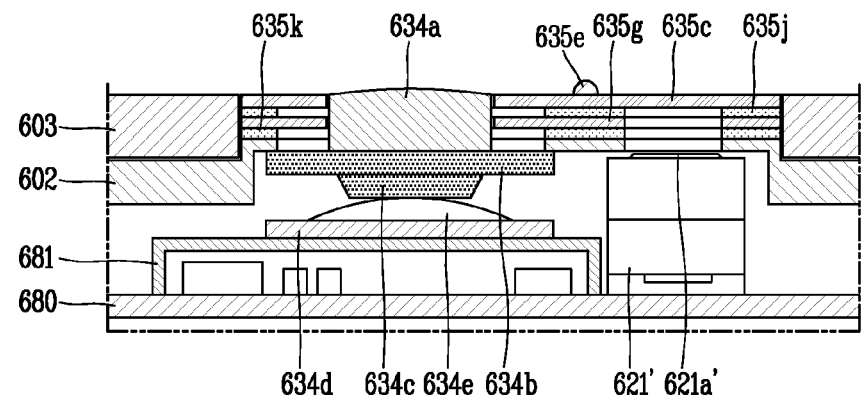

FIGS. 20A and 20B are a disassembled view and a sectional view of the rear input unit 633 illustrated in FIG. 19.

Referring to FIGS. 20A and 20B together with FIG. 19, the rear input unit 633 may include a button part 634 and a touch part 635.

The button part 634 may be externally exposed to a rear surface of a terminal body, and configured to receive a push input of a first function. The first function may be a function related to power on/off or an activation of the display unit 651. Here, the button part 634 may be a power key of the mobile terminal 600.

The touch part 635 may include first and second touch keys 635a and 635b disposed on both sides based on the button part 634. The touch part 635 may receive a touch input of a second function, which is different from the first function. The first and second touch keys 635a and 635b may be configured to generate contrary control commands to each other. The second function, as aforementioned, may be a function associated with volume adjustment of sounds output from the mobile terminal 600.

Such structure will be described in more detail. The touch part 635 may include a window 635c and a touch sensor 635g.

The window 635c may be mounted onto the rear case 602, to be externally exposed through a through hole 603a formed through the battery cover 603. The window 635c may be formed of a transparent material (for example, synthetic resin such as polycarbonate or acrylic, glass, etc.), and include a through hole 635d corresponding to the button part 634. The window 635c may completely cover an outer circumference of the button part 634 inserted into the through hole 635d. To minimize a gap between the window 635c and the button part 634, the through hole 635d may have shape and size which are almost the same as those of the button part 634.

Also, the window 635c may cover a lens part 621a' of the camera module 621', which is disposed adjacent to one side of the first touch key 635a. With the structure, the lens part 621a' may be protected from external circumstances, and a more simplified design for the rear surface of the terminal body may be realized. When the camera module 621'f, the first touch key 635a, the button part 634 and the second touch key 635d are sequentially arranged in one direction (for example, a lengthwise direction of the terminal body), the arrangement may arouse unity and accordingly a design for the rear surface of the mobile terminal 600 may be more upgraded.

The window 635c may be processed to be opaque, except for a portion corresponding to the lens part 621a'. For example, a non-transparent material may be printed or deposited on a rear surface of the window 634c, except for the portion corresponding to the lens part 621a'. Also, a raised spot 635e may protrude from the window 635c between a portion corresponding to the lens part 621a' and a portion between the first ouch key 635a. Accordingly, the user can intuitively distinguish the portions corresponding to the first touch key 635a and the lens part 621a' by tactile sensation which the user feels when a finger touches the raised spot 635e. This may prevent the user from leaving a fingerprint on the lens part 621a' due to touching the lens part 621a' while touching the first touch key 635a. In addition, the raised spot 635e may come in contact with a bottom surface when the mobile terminal 600 is laid in a manner that its rear surfaces faces the bottom, which may prevent the camera module 621' and the touch part 635 from directly coming in contact with each other.

The touch sensor 635g may be located on the rear surface of the window 635c, namely, between the rear case 602 and the window 635c, to sense a touch input onto the window 635c. The touch sensor 635g may be electrically connected to the PCB 680. The touch sensor 635g may be implemented as a capacitive touch sensor or a constant pressure type touch sensor.

These drawings illustrate that the touch sensor 635g is implemented in a form of a sheet having a hole 635h corresponding to the button part 634. Here, the touch sensor 635g may completely cover an outer circumference of the button part 634 inserted into the hole 635h. However, the present disclosure may not be limited to this. The touch sensor 635g may be implemented as two touch sensors corresponding to the first and second touch keys 635a and 635b, respectively, or into a form having a touch pattern formed directly on the rear surface of the window 635c, other than the form of the sheet.

An adhesive member 635j may be disposed between the window 635c and the touch sensor 635g for bonding them to each other. The adhesive member 635j may preferably be formed of a conductive material for transferring a touch input onto the window 635c to the touch sensor 635g. The adhesive member 635j may be implemented into various forms, such as an adhesive, a tape, a form pad and the like. An adhesive member 635k may be disposed between the touch sensor 635g and the rear case 602 for bonding them to each other.

The button part 634 inserted into the through hole 635d of the window 635c may include a key top 634a and an elastic member 634b.

The key top 634a may be externally exposed through the through hole 635d, and made of a rigid material. A surface of the key top 634a, which is externally exposed through the through hole 635d, may form a curved surface 634f, and an opposite surface to the curved surface 634f, namely, a rear surface of the key top 634a may form a flat surface. This may allow the user to recognize a manipulation position of the button part 634 in a tactile manner. Also, in order for the surface of the window 635c to be smoothly connected with the surface of the key top 634a at a boundary therebetween, a portion of the window 635c corresponding to the curved surface 634f of the key top 634a may protrude into a shape of a curved surface toward the key top 634a.

Figure 21:
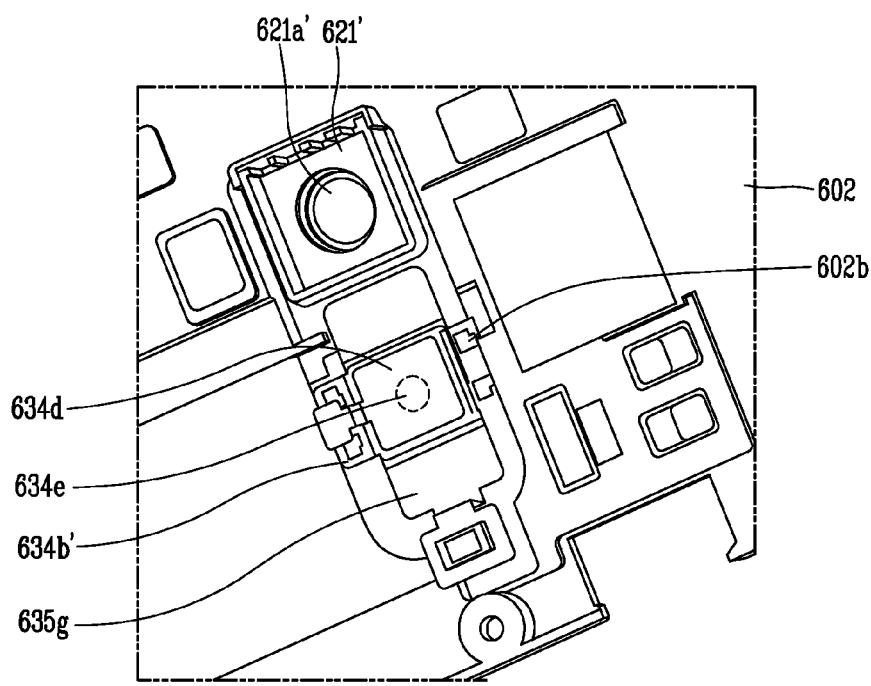
FIG. 21 is a conceptual view illustrating a state that a frame illustrated in FIG. 20A is coupled to an inner side of a rear case.

The elastic member 634b may be disposed on the rear surface of the key top 634a, and include an actuator 634c which presses a switch 634e in response to the key top 634a being pressed. Referring to FIG. 21 which illustrates a structure that the button part 634 is coupled to the rear case 602, the key top 634a may be inserted through the hole 635h of the touch sensor 635g and the through hole 635d of the window 635c and exposed to the outside. Both end portions 634b' of the elastic member 634b may be coupled to the rear case 602 so as to elastically support the key top 634a when the key top 634a is pressed. As illustrated, the both end portion 634b' of the elastic member 634b may overlap the rear surface of the rear case 602 and fixed to the rear case 602 by bosses 602b protruding from the rear cases 602 or separate coupling members. For the coupling structure using the bosses 602b, an end portion of each boss 602b may be welded after the elastic member 634b is inserted, to prevent separation of the elastic member 634b.

The button part 534 may further include a flexible PCB (FPCB) 634d having the switch 634e which is pressed by the actuator 634c when the key top 634a is pressed. The FPCB 634d may be electrically connected to the PCB 680 via a connector. The switch 634e, for example, may be a dome switch, a piezoelectric switch and the like. The FPCB 634d may be supported by a supportable inner structure, or, as illustrated, installed on a shield can 681 disposed on the PCB 680. The shield can 681 may be disposed to cover at least one electric device to shield an EMI, and reinforce rigidity of the PCB 680.

Figure 22A:
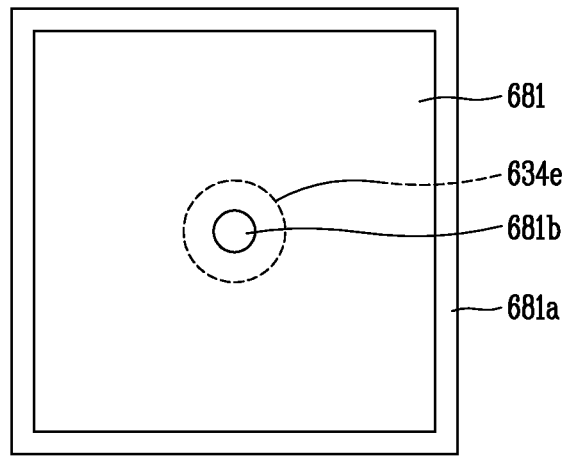
FIGS. 22A and 22B are a disassembled view of a rear input unit according to another exemplary embodiment of the present disclosure.
Figure 22B:
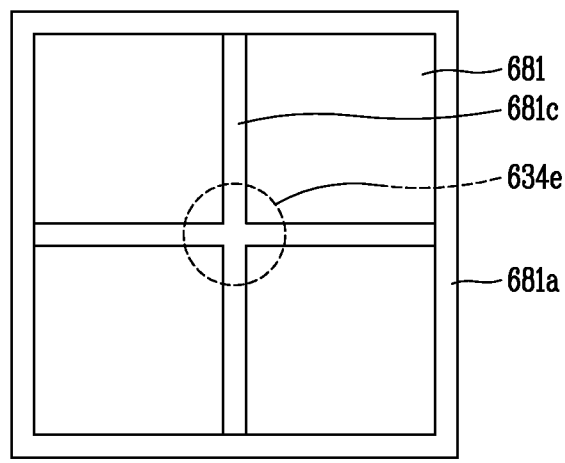

Referring to FIGS. 22A and 22B illustrating an inner surface of the shield can 681, an end portion of the shield can 681 made of a metal may be bent into a form of a wall 681a and supported on the PCB 680.

The shield can 681 may include supporting portions 681b and 681c protruding from the inner surface thereof and supported on the PCB 680. The supporting portion 681b and 681b may support the switch 634e together with the wall 681a when the actuator 634c is pressed. The supporting portion 681b and 681 b may protrude in a shape of bass as illustrated in FIG. 22A or protrude into a shape of bar as illustrated in FIG. 22B. To effectively support the switch 534e, the supporting portion 681b and 681b may overlap the switch 634e.

Figure 23A:
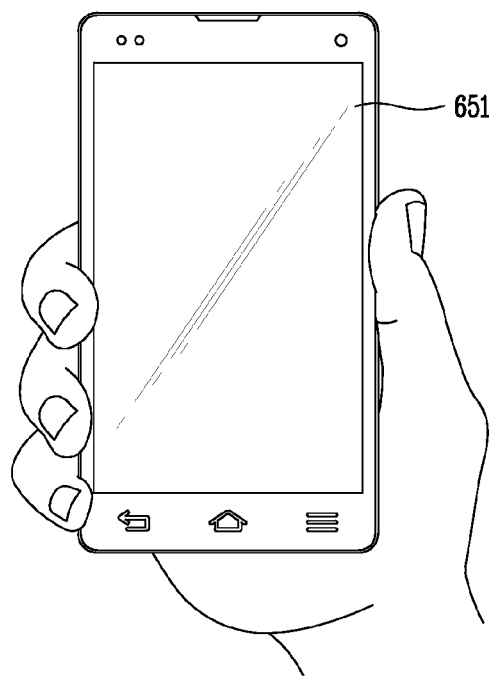
FIGS. 23A to 27 are conceptual views, respectively, illustrating exemplary operations implemented by the mobile terminal of FIG. 19.

FIGS. 23A to 24 are conceptual views, respectively, illustrating exemplary operations implemented by the mobile terminal 600 of FIG. 19.

The controller 180 which controls the functions of the mobile terminal 600 may process an input applied to the rear input unit 633 as a control command of a different function according to an operating mode of the mobile terminal 600.

For example, an input with respect to the rear input unit 633 may be volume adjustment, a conversion of a playback file or the like in a music or video playback mode, zooming, exposure value adjustment or the like in a capturing mode, and zooming, scrolling or the like in an Internet mode.

Figure 23B:
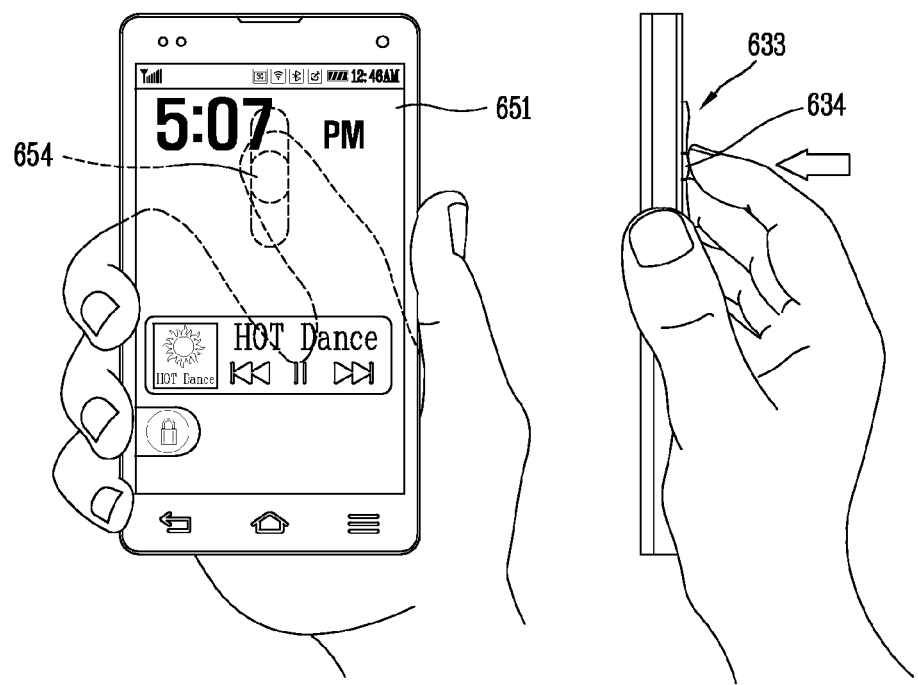
Figure 23C:
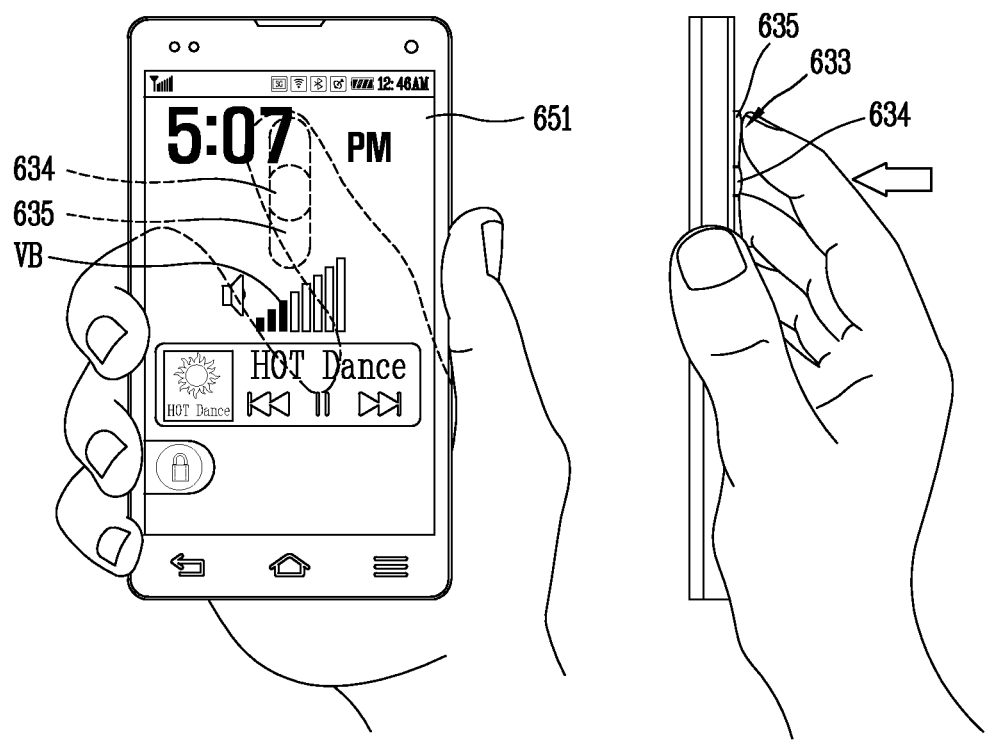

Referring to FIGS. 23A to 23C, the display unit 651 may output a graphic user interface (GUI) of an application which is being executed. The display unit 651 may be implemented as a touch screen for allowing a touch input with respect to the GUI. The display unit 651 may output the GUI, namely, visual information, which is displayed in form of image, text, icon and the like, but may be converted into a deactivated state (namely, a display-OFF state) after a predetermined time is elapsed or when a specific control command is input, as illustrated in FIG. 23A. FIG. 23A exemplarily illustrates that the display unit 651 is deactivated while a music playback application is executed.

Referring to FIG. 23B, when a push input is applied to the button part 534 in the state illustrated in FIG. 23A, the display unit 651 may be activated. That is, the button part 634 may be a power key for turning on or off the display unit 651. Also, power on/off of the mobile terminal 600 may also be executed by the button part 634. This drawing illustrates that the display unit 651 is activated and a GUI of a music playback application is output.

Referring to FIG. 23C, when a touch input is applied to the touch part 635 in the state illustrated in FIG. 23B, a volume bar may be output to allow for volume adjustment. Here, the present disclosure may not be limited to the process. Even in the state illustrated in FIG. 23*a*, a touch input with respect to the touch part 635 may also be an input for the volume adjustment.

As such, the user can control the display unit 651 by manipulating the rear input unit 633 while viewing the full display unit 651 without interruption.

Figure 24A:
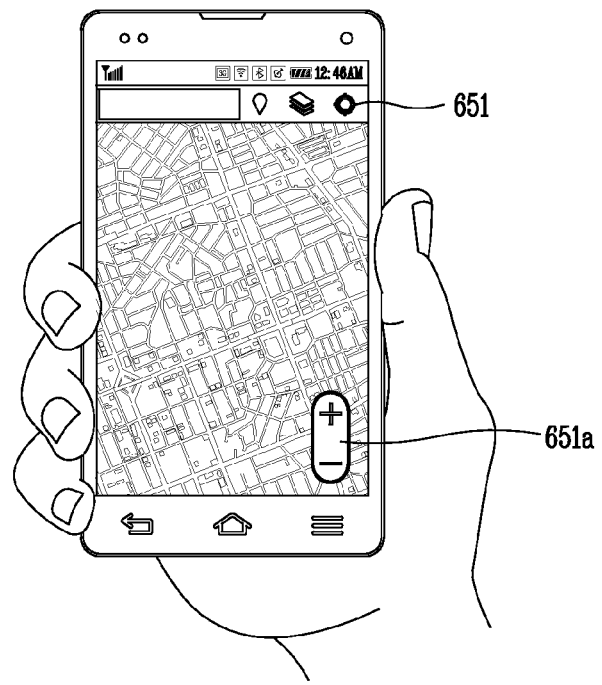
Figure 24B:
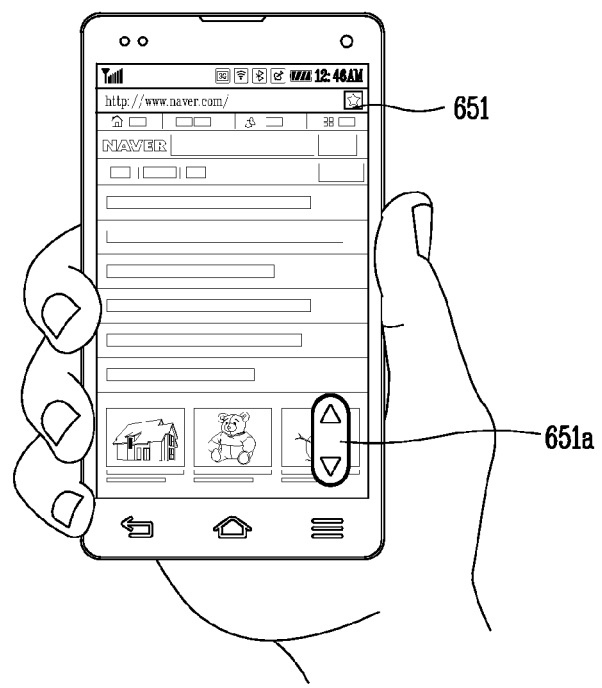
Figure 24C:
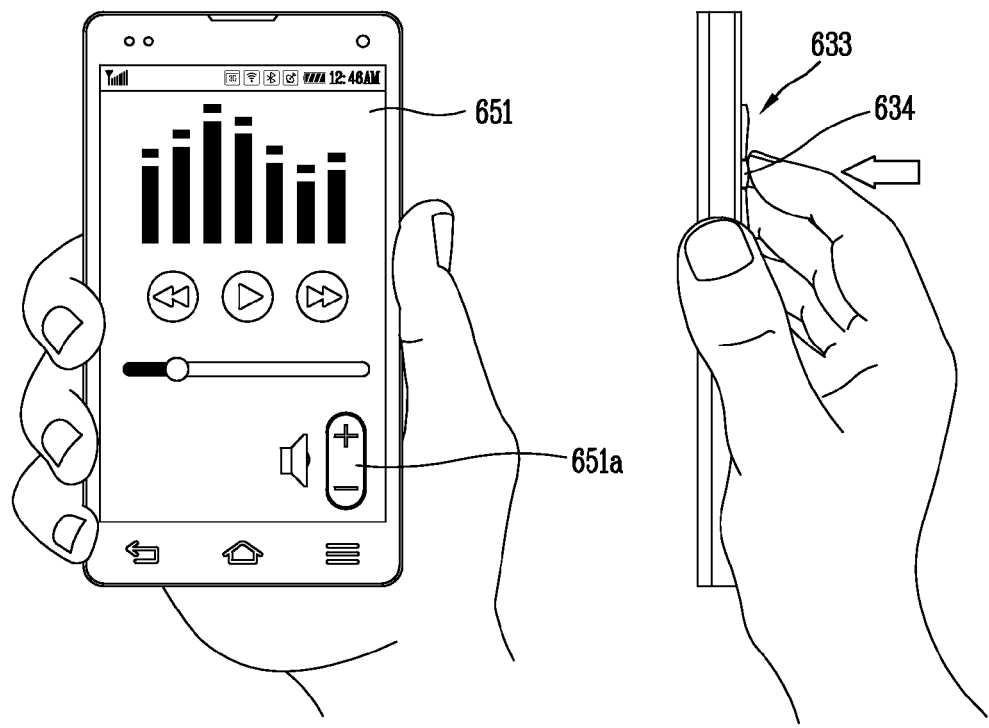
Figure 24C:
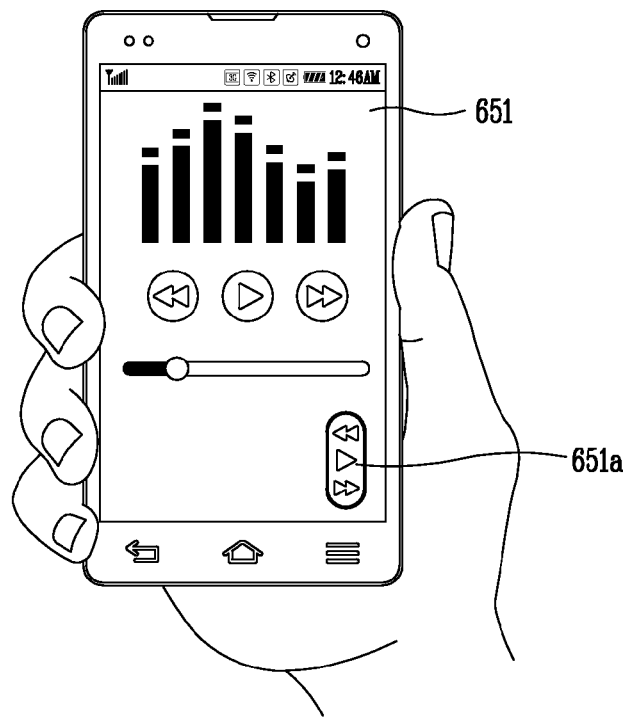

Referring to FIGS. 24A to 24C, the display unit 651 may output information indicating which touch key of the first and second touch keys 635*a* and 635*b* is currently touched. For example, an image related to the rear input unit 633 (hereinafter, referred to as a key image) 651*a* may be output on the display unit 651, and an icon related to the information may be displayed within the key image 651*a*.

The displayed icon may be formed as a pair to correspond to the first and second touch keys 635*a* and 635*b*. For example, when a control command (for example, volume, zooming, etc.) associated with UP/DOWN is input, a pair of icons may be '+' and '−' (see FIG. 24A). The pair of icons + and − may be disposed on both ends of the key image 651*a* in a lengthwise direction of the key image 651*a* (i.e., a lengthwise direction of the terminal body). Here, a touch input with respect to the first touch key 635*a* may be set to zoom-in, and a touch input with respect to the second touch key 635*b* may be set to zoom-out.

Referring to FIG. 24B, when a webpage is output in an Internet mode, the first and second touch keys 635*a* and 635*b* may receive a control command associated with a scroll, and the displayed icons may be related images. For example, the icons related to the scroll may be Δ and ∇.

Referring to FIG. 24C, the icon may change in shape in cooperation with a push input applied to the button part 634. Hereinafter, a music mode may be described as one example, but it may also be applied to other modes. While icons + and − indicating a volume adjustment are output, a control command related to a volume adjustment may be input through the first and second touch key 635*a* and 635*b*. Under this state, when a push input is applied to the button part 634, the icons may be converted into icons indicating rewinding and forwarding, and the first and second touch keys 635*a* and 635*b* may be converted to receive a control command related to the rewinding and forwarding.

Figure 25:
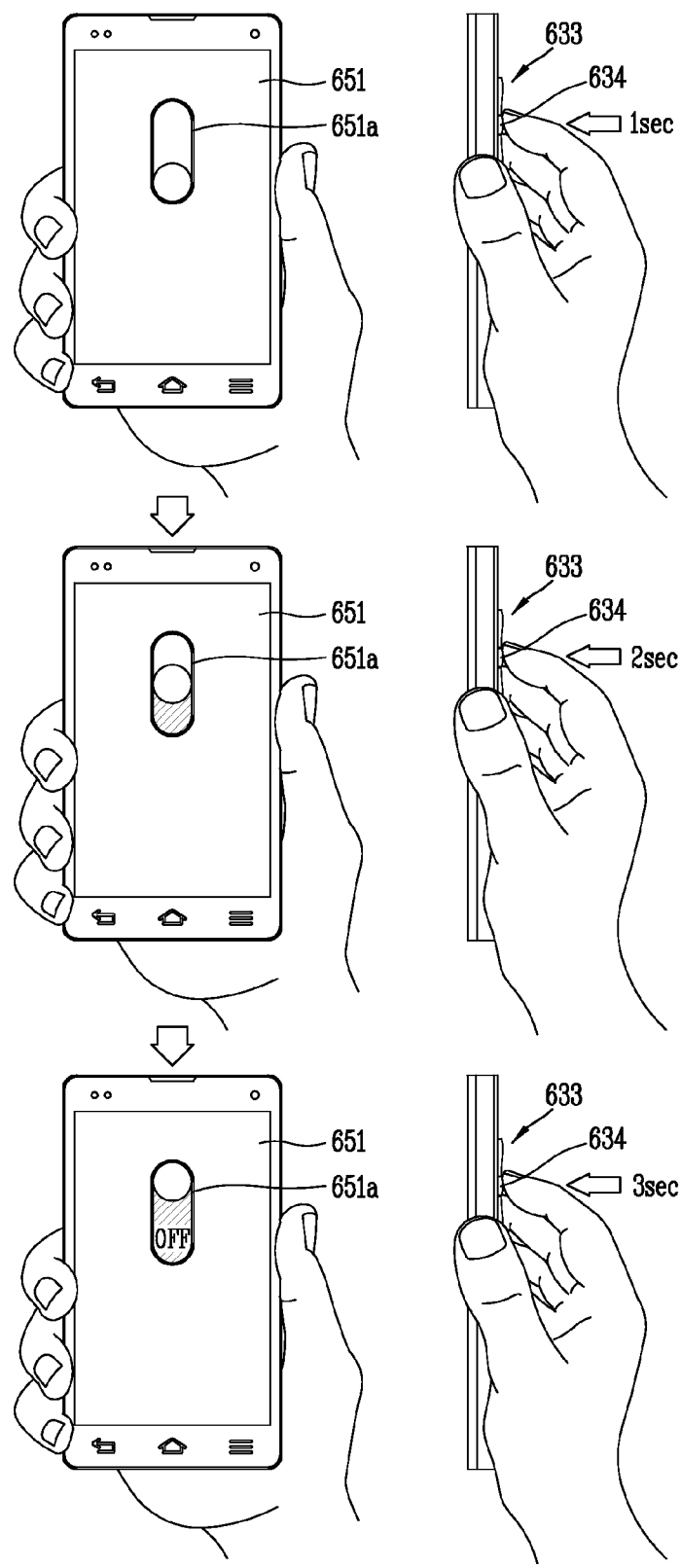

Referring to FIG. 25, the display unit 651 may output information related to an extended time of a push input or a touch input with respect to the button part 634 or the touch input 635.

As one example, the controller 180 may generate a control command based on a duration of time of the push input applied to the button part 634, and information which varies according to the duration time may be output on the display unit 651. In case where the mobile terminal 600 is powered off when a push input is applied to the button part 634, the icon may be moved from one end to the other end of the key image 651*a* in response to the push input applied. If the push input is applied for a preset time, the icon may be moved down to the other end of the key image 651*a* and an OFF command may be executed.

As such, the user interface may vary into different shapes. For example, in a capturing mode in which a preview screen is output on the display unit 651, capturing may not be immediately executed by the push input onto the button part 634. Rather, a user interface that capturing is executed when the icon reaches the end of the key image 651*a* while moving for the duration of time of the push input may be realized.

Figure 26A:
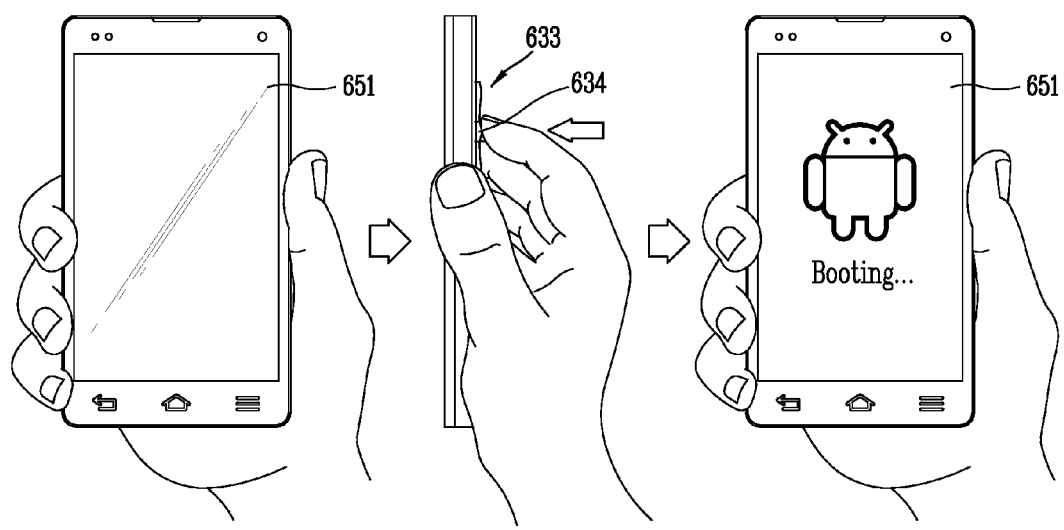
Figure 26B:
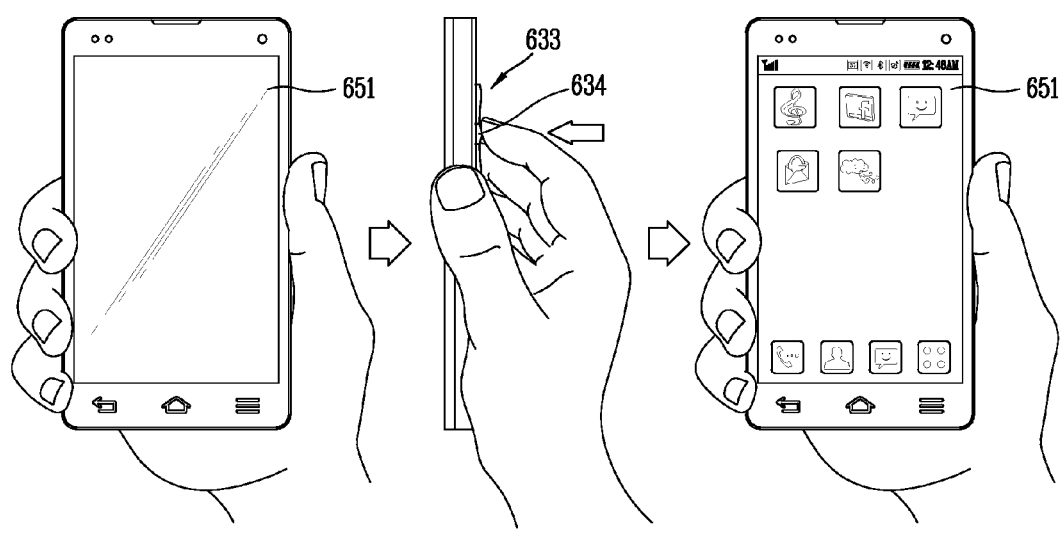
Figure 26C:
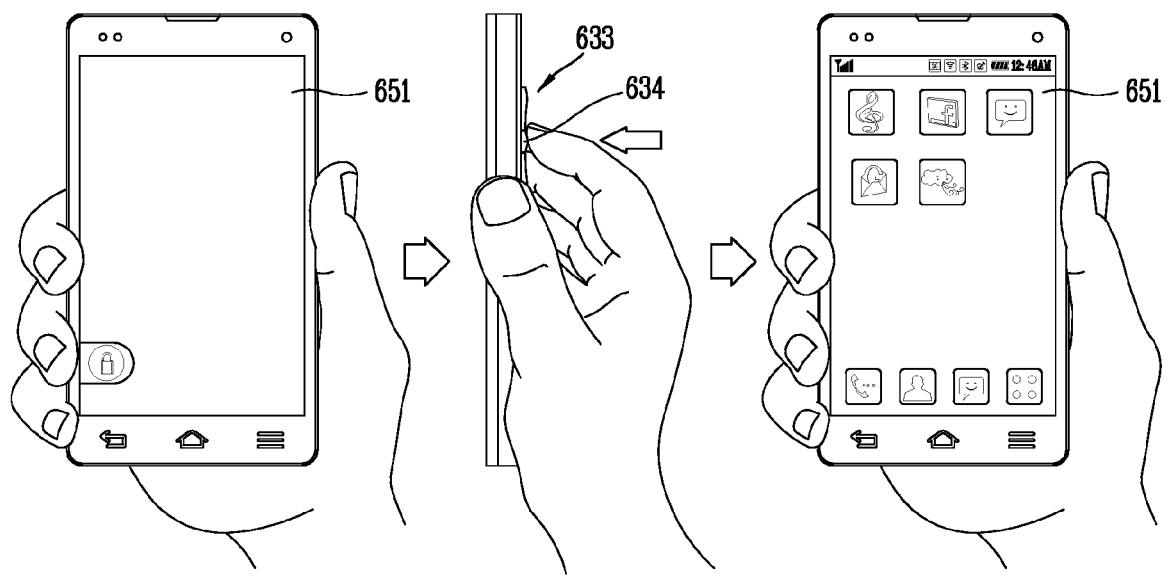

FIGS. 26A to 26C are views illustrating user interfaces related to the process that the touch part 635 is activated in response to an input applied to the button part 634.

As illustrated in FIGS. 26A to 26C, whether or not the touch part 635 is to be driven may be decided by a push input with respect to the button part 634. In more detail, the push input may be defined as an input for a power on/off command of the mobile terminal 600. That is, in the power off state of the mobile terminal 600, the mobile terminal 600 may be powered on in response to the push input being applied to the button part 634 (see FIG. 26A). The touch part 635 may be activated only after the mobile terminal 600 is powered on.

As another example, the push input may be defined as an input for an ON/OFF command of the display unit 651. In a deactivated state of the display unit 651, the touch part 635 may not sense a touch input. The display unit 651 may be activated when a push input is applied to the button part 634 (see FIG. 26B). The touch part may be activated only after the display unit 651 is activated. This operation may bring about prevention of mis-operation of the mobile terminal 600. This may result in preventing activation or deactivation of functions and applications of the mobile terminal 600, due to an input of a user-undesired control command in the mobile terminal 600 allowing for the touch input.

As another example, the push input may be an input related to unlocking. States of the mobile terminal 600 may be divided into 'lock state' and 'unlock state' depending on whether or not an input of a control command is allowed. A conversion between the lock state and the unlock state may be executed by the push input. Here, the lock state may be a state of restricting a user from inputting a control command for applications installed in the terminal.

As such, the lock state may be released when the push input is applied to the button part 634 (see FIG. 26C). When the lock state is released, a key input with respect to the touch part 635 as well as the touch input with respect to the display unit 651 may be enabled.

Figure 27:
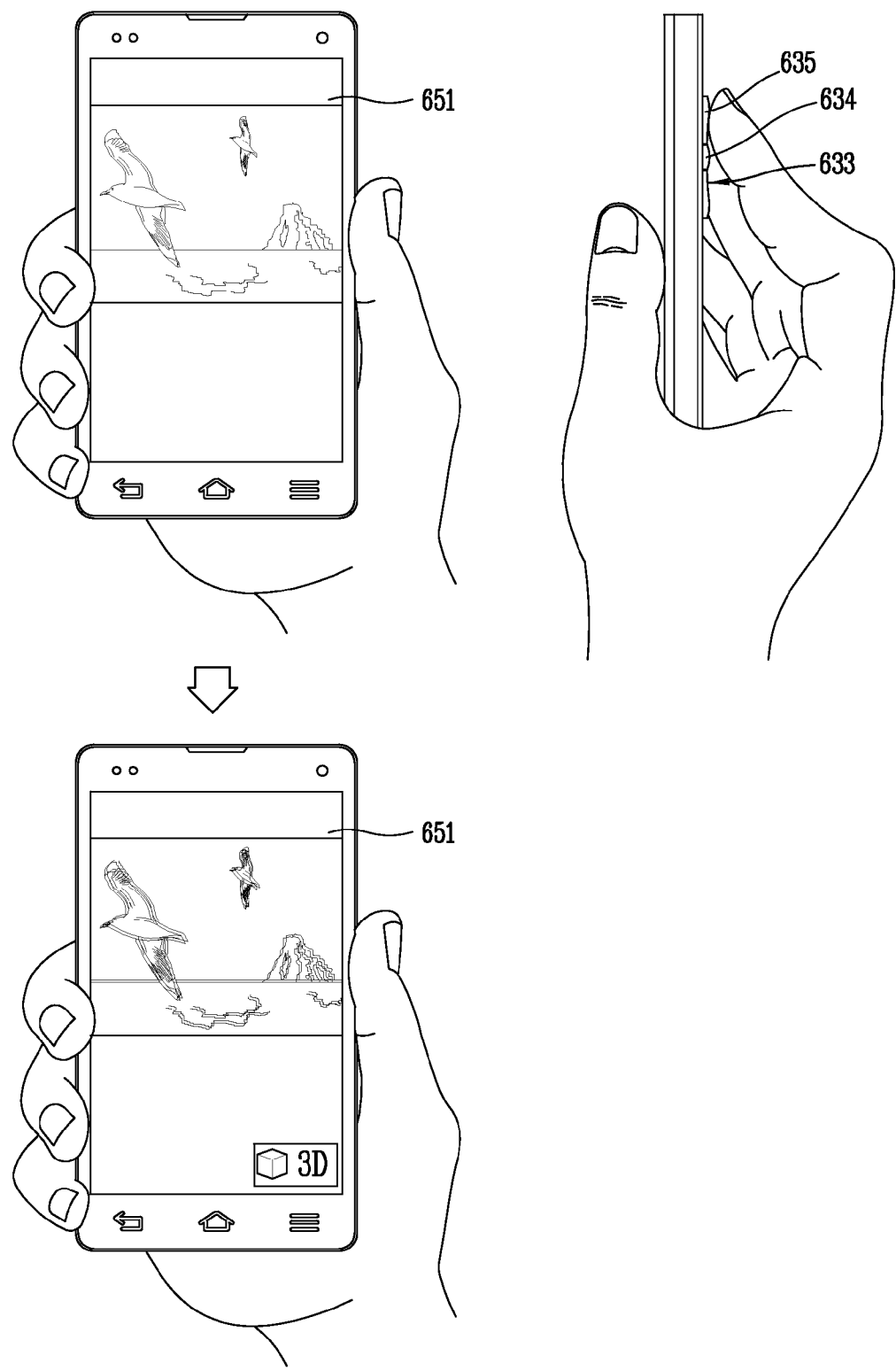

Referring to FIG. 27, when the touch input onto the display unit 651 and the touch input onto the touch part 635 are simultaneously applied, the controller 180 may generate a control command corresponding to the simultaneous input.

As one example, when the display unit 651 and the first touch key 635a are touched together, a 2D image output on the display unit 651 may be converted into a 3D image. On the other hand, when the display unit 651 and the second touch key 635b are touched together, the 3D image output on the display unit 651 may be converted back into the 2D image.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body having a front surface and a rear surface;
a front display unit disposed on the front surface and configured to output visual information thereon; and
a rear input unit disposed on the rear surface and configured to be manipulated to input a control command,
wherein the terminal body is a bar-type terminal body,
wherein the rear input unit overlaps with the front display unit, the rear input unit comprising:
a frame installed on a case of the terminal body to be manipulated in a pressing manner, and having a mounting portion;
a rear display mounted onto the mounting portion, and configured to output visual information toward the rear surface, the visual information being related to an event generated in the mobile terminal;
a window mounted to the frame and covering the rear display;
a touch sensor located between the window and the rear display for sensing a touch applied to the window; and
a controller configured to execute a function related to an event,
wherein visual information relating to the event is output on the rear display, and
wherein the execution of the function relating to the event by the controller causes the rear display to turn off and the front display unit to output a screen for the executed function when a touch input is applied to the window and the terminal body is rotated within a preset range.

2. The terminal of claim 1, wherein the rear display is configured to output thereon visual information in cooperation with the front display unit.

3. The terminal of claim 1, wherein the visual information output on the front display unit is changed in response to the frame being pressed.

4. The terminal of claim 1, wherein the rear display is disposed to overlap the front display unit in a thickness direction of the terminal body.

5. The terminal of claim 1, wherein the frame is tilted when one side thereof is pressed, so as to press a side switch corresponding to the one side.

6. The terminal of claim 5, wherein the frame is configured to generate a different control command according to a tilting direction.

7. The terminal of claim 5, wherein the side switch is disposed on each edge of the frame or each portion between two edges of the frame.

8. The terminal of claim 5, wherein the frame comprises a side actuator protruding from a rear surface thereof and configured to press the side switch when the one side of the frame is pressed.

9. The terminal of claim 5, wherein a side actuator which presses the side switch when the one side of the frame is pressed is formed on an upper end portion of the side switch in an integral form with the side switch.

10. The terminal of claim 9, wherein the frame comprises a supporting portion recessed into a rear surface of the frame, facing the side switch, and configured to cover a part of an outer side of the side actuator.

11. The terminal of claim 5, further comprising:
a button part disposed on the rear surface to be manipulated in a pressing manner, and disposed to overlap the front display unit in a thickness direction of the terminal body, the button part being configured to generate a control command corresponding to ON/OFF of the front display unit when being pressed.

12. The terminal of claim 11, further comprising:
a flexible printed circuit board having the side switch pressed when the frame is tilted and a button switch pressed in response to the button being pressed, the flexible printed circuit board being mounted on a shield can installed on a printed circuit board.

13. The terminal of claim 11, further comprising:
a camera module disposed on the rear surface and configured to capture an image,
wherein an image captured by the camera module is output on the rear display when the camera module is operating.

14. The terminal of claim 1, wherein the window is processed opaque, except for a portion corresponding to the rear display.

15. The terminal of claim 1, wherein the rotation of the terminal body within the preset range is sensed by a sensing unit.

16. The terminal of claim 15, wherein the sensing unit senses the change in a placed status of the terminal body in a proximity sensor, a light sensor, or gyro sensor.

17. The terminal of claim 15, wherein the rear display is turned off and the front display unit outputs the visual information related to the event when the function associated with the event is executed by the controller.

18. The terminal of claim 15, wherein a window associated with the event is popped-up when a multi-touch onto the front display unit is sensed while the function associated with the event is executed.

19. The terminal of claim 1, wherein a pointer is displayed on the front display unit and movable in response to dragging on the window when a touch input onto the window is sensed by the touch sensor.

* * * * *